United States Patent [19]
Chhabra

[11] Patent Number: 5,949,614
[45] Date of Patent: Sep. 7, 1999

[54] ADJUSTABLE NEGATIVE PRESSURE AIR BEARING SLIDER

[75] Inventor: Devendra Singh Chhabra, San Jose, Calif.

[73] Assignee: Headway Technologies, Inc., Milpitas, Calif.

[21] Appl. No.: 08/959,756

[22] Filed: Oct. 29, 1997

Related U.S. Application Data

[63] Continuation of application No. 08/623,262, Mar. 27, 1996, Pat. No. 5,831,791.

[51] Int. Cl.$^6$ ........................................................ G11B 5/60
[52] U.S. Cl. ............................................................. 360/103
[58] Field of Search ............................................. 360/103

[56] References Cited

U.S. PATENT DOCUMENTS

| | | | |
|---|---|---|---|
| 3,855,625 | 12/1974 | Garnier et al. | 360/103 |
| 3,990,106 | 11/1976 | Kameyama et al. | 360/103 |
| 4,081,846 | 3/1978 | Roscamp et al. | 360/103 |
| 4,212,044 | 7/1980 | Plotto | 360/103 |
| 4,218,715 | 8/1980 | Garnier | 360/103 |
| 4,251,839 | 2/1981 | Yamamoto et al. | 360/103 |
| 4,285,019 | 8/1981 | Scott et al. | 360/103 |
| 4,420,780 | 12/1983 | Deckert | 360/103 |
| 4,475,135 | 10/1984 | Warner et al. | 360/103 |
| 4,553,184 | 11/1985 | Ogishima | 360/103 |
| 4,555,739 | 11/1985 | Le Van et al. | 360/103 |
| 4,636,894 | 1/1987 | Mo | 360/103 |
| 4,646,180 | 2/1987 | Ohtsubo | 360/103 |
| 4,700,248 | 10/1987 | Coughlin et al. | 360/103 |
| 4,734,803 | 3/1988 | Nishihira | 360/103 |
| 4,757,402 | 7/1988 | Mo | 360/103 |
| 4,769,727 | 9/1988 | Mao | 360/103 |
| 4,796,126 | 1/1989 | Tsuchiya et al. | 360/103 |
| 4,802,042 | 1/1989 | Strom | 360/103 |
| 4,893,204 | 1/1990 | Yamada et al. | 360/103 |
| 4,894,740 | 1/1990 | Chhabra et al. | 360/103 |
| 4,928,195 | 5/1990 | Ezaki et al. | 360/103 |

(List continued on next page.)

FOREIGN PATENT DOCUMENTS

| | | |
|---|---|---|
| 1289180 | 9/1991 | Canada. |
| 0 262 655 B1 | 4/1988 | European Pat. Off.. |
| 0 277 414 B1 | 8/1988 | European Pat. Off.. |
| 0 458 444 A2 | 11/1991 | European Pat. Off.. |
| 0 458 445 A2 | 11/1991 | European Pat. Off.. |
| 0 466 502 A1 | 1/1992 | European Pat. Off.. |
| 0 518 566 A1 | 12/1992 | European Pat. Off.. |
| 0 558 983 A1 | 9/1993 | European Pat. Off.. |
| 0 576 803 A1 | 1/1994 | European Pat. Off.. |
| 0 592 697 A1 | 4/1994 | European Pat. Off.. |
| 0 595 513 A2 | 5/1994 | European Pat. Off.. |
| 0 600 348 A2 | 6/1994 | European Pat. Off.. |
| 0 614 175 A1 | 9/1994 | European Pat. Off.. |

OTHER PUBLICATIONS

Chhabra et al., "Air Bearing Design Considerations for Constant Fly Height Applications" (IEEE Transactions on Magnetics, vol. 30, No. 2, Mar. 1994, pp. 417–423).

*Primary Examiner*—A. J. Heinz
*Attorney, Agent, or Firm*—Skjerven, Morrill, MacPherson, Franklin & Friel LLP; Kenneth E. Leeds; Serge J. Hodgson

[57] ABSTRACT

An improved negative pressure air bearing (NPAB) slider for rotating disk drives provides an easy means of controlling the slider characteristics including roll, pitch, fly height and skew sensitivity. The NPAB slider has positive pressure, negative pressure and transition regions whereby the shape of the regions determine the direction and amount of air flowing into the negative pressure region and thus the magnitude and distribution of negative pressure generated. The regions can be formed during a single etch to a single etch depth simplifying manufacturing. One embodiment includes a third rail located within the negative pressure region. Other embodiments include side rails with leading edge tapers or alternatively leading edge steps.

32 Claims, 19 Drawing Sheets

U.S. PATENT DOCUMENTS

| | | | |
|---|---|---|---|
| 4,939,603 | 7/1990 | Inumochi | 360/103 |
| 4,939,604 | 7/1990 | Fukuda et al. | 360/103 |
| 4,961,121 | 10/1990 | Astheimer et al. | 360/103 |
| 4,984,114 | 1/1991 | Takeuchi et al. | 360/103 |
| 5,062,017 | 10/1991 | Strom et al. | 360/103 |
| 5,086,360 | 2/1992 | Smith et al. | 360/103 |
| 5,097,370 | 3/1992 | Hsia | 360/103 |
| 5,128,822 | 7/1992 | Chapin et al. | 360/103 |
| 5,136,445 | 8/1992 | Zak | 360/103 |
| 5,196,973 | 3/1993 | Chapin et al. | 360/103 |
| 5,210,666 | 5/1993 | Chapin et al. | 360/103 |
| 5,285,337 | 2/1994 | Best et al. | 360/97.02 |
| 5,309,303 | 5/1994 | Hsia et al. | 360/103 |
| 5,317,465 | 5/1994 | Chapin | 360/103 |
| 5,343,343 | 8/1994 | Chapin | 360/103 |
| 5,396,386 | 3/1995 | Bolasna et al. | 360/103 |
| 5,396,388 | 3/1995 | Bolasna | 360/103 |
| 5,404,256 | 4/1995 | White | 360/103 |
| 5,430,591 | 7/1995 | Takeuchi | 360/103 |
| 5,438,467 | 8/1995 | Dorius | 360/103 |
| 5,508,862 | 4/1996 | Lazzari | 360/103 |
| 5,550,692 | 8/1996 | Crane | 360/103 |

ADJUSTABLE NEGATIVE PRESSURE AIR BEARING SLIDER

This application is a continuation of application Ser. No. 08/623,262, filed Mar. 27, 1996, now U.S. Pat. No. 5,831,791.

FIELD OF THE INVENTION

This invention relates generally to magnetic head assemblies for rotating disk drives and more particularly to negative pressure air bearing sliders for use with rotary actuators.

BACKGROUND OF THE INVENTION

FIG. 1a shows a conventional magnetic disk drive. The disk drive includes a magnetic disk 1 for storing data, and a read-write head 2 for reading data from and writing data to magnetic disk 1. Typically, read-write head 2 comprises a slider upon which a transducer is mounted. During use, disk 1 is rotated by a motor (not shown). Rotation of disk 1 generates wind which causes read-write head 2 to "fly" above the disk surface. Disk drives of this nature are used extensively.

Read-write head 2 is mounted on an actuator arm 3, which in turn can be rotated by a motor 4 so that read-write head 2 can be maneuvered over and read data from the various tracks of disk 1. Actuator arm 3 holds read-write head 2 at an angle known as the "skew angle." The skew angle is defined as the angle (shown in FIG. 1a as θ) between the longitudinal axis of read-write head 2 (which is parallel to actuator arm 3) and the wind direction W at the location where read-write head 2 is flying. Skew changes as read-write head 2 is moved by actuator arm 3 from the inner diameter to the outer diameter of disk 1 as shown in FIG. 1a.

A class of sliders that perform well are negative pressure air bearing (NPAB) sliders. Strom et al., U.S. Pat. No. 5,062,017 (incorporated herein by reference) discloses a NPAB slider which includes a cross-rail extending between first and second side rails. A similar NPAB slider 110 is shown in FIG. 2. Slider 110 comprises a leading edge 100, a trailing edge 101, first and second side edges 102, 103, first and second raised side rails 104, 105 positioned along first and second side edges 102, 103, respectively, and a leading bridge or cross rail 106. During use, cross-rail 106 creates negative pressure in a region 107. Slider 110 also includes leading edge tapers 108, 109 for facilitating flow of air under rails 104, 105 during takeoff.

NPAB slider 110 is formed using a two step etch process. Negative pressure region 107 is etched to a first depth, typically 5 to 10 microns (μm) below the surfaces of first and second raised side rails 104, 105. Cross-rail 106 is etched to a second depth, typically 1 to 2 μm below the surfaces of first and second raised side rails 104, 105.

Standard slider dimensions are 4.0 mm×3.2 mm×0.85 mm (length, width, height). However the art is moving towards smaller sliders, such as nano and pico sliders. Standard slider dimensions are reduced by 50% in nano sliders, and by 70% in pico sliders. As shown by the dimensions in FIG. 2, slider 110 is a nano slider.

Slider performance is measured using several parameters. One important parameter is the "fly height", which is the distance between the magnetic transducer on read-write head 2 and the magnetic layer in disk 1. (FIG. 1a).

Another important parameter is "roll". Roll is the difference between the distance between inside rail 104 and disk 1 and the distance between outside rail 105 and disk 1 while read-write head 2 is flying over disk 1.

Another important parameter is "pitch". Pitch is the difference between the distance between leading edge 100 and disk 1 and the distance between trailing edge 101 and disk 1 while read-write head 2 is flying over disk 1.

In magnetic recording technology, there are two areas of desired continual improvements. The first is to increase the recording density to maximize the amount of data that can be stored on the surface of a disk. The second is to reduce the time in which data stored on a disk is accessed, i.e. to reduce the access time.

Recording density can be increased by reducing the average fly height over the entire surface of the disk. The average fly height must be sufficient to prevent contact between the slider and the disk due to fly height non-uniformity across the disk surface. Fly height non-uniformity results in large part from variations in wind speed and skew. Thus sliders with designs which are relatively insensitive to wind speed variation and skew variation have better fly height uniformity over the entire disk surface. As fly height uniformity is improved, the average fly height can be reduced, thus allowing the recording density to be increased.

Of importance, NPAB sliders improve fly height uniformity across the disk surface by offsetting changes in lift related to changes in wind speed. Referring to FIG. 2, the positive pressure exerted on the first and second raised side rails 104, 105 provides lift, or upward force on slider 110. The total downward force on slider 110 is the sum of the force caused by negative pressure generated in region 107 and a fixed external load (not shown) applied on slider 110 by the head suspension, known as suspension preload. As the disk rotates, the wind speed beneath the slider is greater at the outer diameter OD of the disk than at the inner diameter ID (FIG. 1a). Thus the lift is greater at outer diameter OD than at inner diameter ID. However, more negative pressure is also generated at the outer diameter OD of the disk which offsets the increase in lift due to greater wind speed. Thus, negative pressure designs improve fly height uniformity.

Fly height uniformity is also improved by reducing slider skew sensitivity. At skewed conditions, the effective areas of first and second raised side rails 104, 105 decrease (see Strom et al., '017, column 2, lines 19–46). This decrease in effective area results in decreased lift and fly height. Thus skew creates fly height non-uniformity. Therefore sliders with reduced skew sensitivity have improved fly height uniformity.

Fly height uniformity is further improved by reducing roll associated with skew. At skewed conditions, NPAB sliders exhibit roll because downstream rail 105 (or 104 depending upon whether the skew angle is negative or positive) receives little air from negative pressure region 107 while at the same time upstream rail 104 (or 105) receives air at ambient pressure. Since the magnetic transducer is typically located at trailing edge 101 of outer rail 105, roll affects transducer performance because it introduces fly height non-uniformity. Again, sliders with reduced skew sensitivity have improved fly height uniformity.

It is possible to reduce fly height by selecting an appropriate pitch angle. Sliders with large pitch exhibit reduced stiffness about the pitch axis, and thus have a tendency to rock about the pitch axis when dynamically excited (e.g. if the slider hits an asperity on the disk). The slider must fly at a height which is high enough to accommodate such rocking motion. As pitch is reduced, the dynamic performance of the slider is improved, and the tendency of the slider to rock is reduced. Thus, sliders with reduced pitch may be used with a lower fly height. However, there are disadvantages to having pitch that is too low. For example, if pitch is too low, it becomes more likely that the head will strike asperities on the disk, thereby increasing the likelihood of mechanical failure. Accordingly, read-write heads should have pitch angles that are neither too large nor too small.

Recording density can also be improved by reducing slider sensitivity to various manufacturing processes used in the production of sliders. In particular, recording density can be improved by reducing slider sensitivity to taper length variations caused during manufacturing. Taper length variations change the surface areas of leading edge tapers 108, 109 and thus the lift provided by leading edge tapers 108, 109. Also, taper length variations change the surface areas of first and second raised side rails 104, 105 and thus the lift provided by first and second raised side rails 104, 105. The combined effect changes the overall lift on slider 110. As the overall lift varies, so does the fly height. Thus the average fly height must be increased to account for taper length variations caused during manufacturing. As discussed, increasing the average fly height reduces recording density.

Reducing access time is the second area of continual desired improvement in magnetic recording technology. Referring to FIG. 1a, during accessing, read-write head 2 is moved sideways (see arrow A) from one data track to another by actuator arm 3. This is known as "head seek". By reducing the amount of time required to move from one track to another, access time is reduced. One way to reduce the amount of time required to move read-write head 2 from one track to another is to increase the speed at which read-write head 2 moves from one track to another, i.e. the access velocity.

Increasing access velocity increases access skew (skew created momentarily by the sideways motion of the slider during accessing). FIG. 1b is a vector diagram of a slider during accessing at the inner diameter of disk 1 (FIG. 1a). Referring to FIG. 1b, access skew ($\theta_A$) is related to skew angle $\theta$, access velocity ($V_A$) and the velocity of the disk surface where the slider is flying, i.e. disk velocity ($V_D$), as set forth in the following equation:

$$\theta_A = \left(ARCTAN\left[\frac{V_D Sin\theta + V_A}{V_D Cos\theta}\right]\right) - \theta \quad (1)$$

As set forth in equation 1, at a fixed disk velocity $V_D$, increasing access velocity $V_A$ increases access skew $\theta_A$. Access skew adversely affects fly height uniformity for the same reasons as those discussed above for skew. However, it is desirable to maintain a constant fly height during accessing. Therefore, sliders with reduced skew sensitivity, hence improved fly height uniformity during accessing, exhibit superior accessing performance.

It is desirable to increase recording density and accessing performance. Thus it is desirable to design a slider with reduced sensitivities to wind speed and skew. It is also desirable to design a slider with reduced sensitivity to taper length variation and to simplify manufacturing by producing a NPAB slider using only a single etch step.

It is also important to be able to readily tailor the roll, pitch and fly height characteristics to meet specifications established for different disk drives by their manufacturers. These characteristics can be tailored by controlling the magnitude and distribution of the force created by negative pressure as part of the overall NPAB slider design. Therefore, it is desirable to have structures in the NPAB slider that provide an easy means of controlling the magnitude and distribution of the force created by negative pressure.

SUMMARY OF THE INVENTION

The invention relates to a NPAB slider wherein the negative pressure generated can be adjusted to obtain desired slider characteristics. The slider has a leading edge, a trailing edge, a first side edge and a second side edge. Positioned along the first and second side edges are first and second raised side rails. The first and second raised side rails have leading edge tapers. Located between the first and the second raised side rails is a recessed surface area which is divided into three regions.

In one embodiment, the slider includes a positive pressure region, a negative pressure region and a transition region. The positive pressure region is located between the first and second raised side rails adjacent to the leading edge. The negative pressure region is located between the first and second raised side rails adjacent to the trailing edge. The transition region is located between the positive and negative pressure regions and between the first and second raised side rails.

In other embodiments, the slider further includes a third rail located within the negative pressure region. In one of the embodiments including a third rail, the first and second raised side rails do not extend all the way to the trailing edge.

In other embodiments, the leading edge tapers on the first and second raised side rails are replaced with leading edge steps. In manufacturing the leading edge steps, tolerances are improved which reduces fly height variations between sliders.

In all of the above embodiments the positive pressure region, negative pressure region and transition region can be formed during the same etch step.

During use, the shapes of the positive pressure region, negative pressure region and transition region control the volume and direction of wind into the negative pressure region and thus the magnitude and distribution of the negative pressure generated. By appropriately shaping the regions, the magnitude and distribution of negative pressure generated can be controlled. This provides a convenient means for tailoring fly height, roll and pitch characteristics. Furthermore, this provides a convenient means for producing a slider which is substantially insensitive to skew, and thus has superior dynamic performance during accessing.

DETAILED DESCRIPTION

Figure 3A:
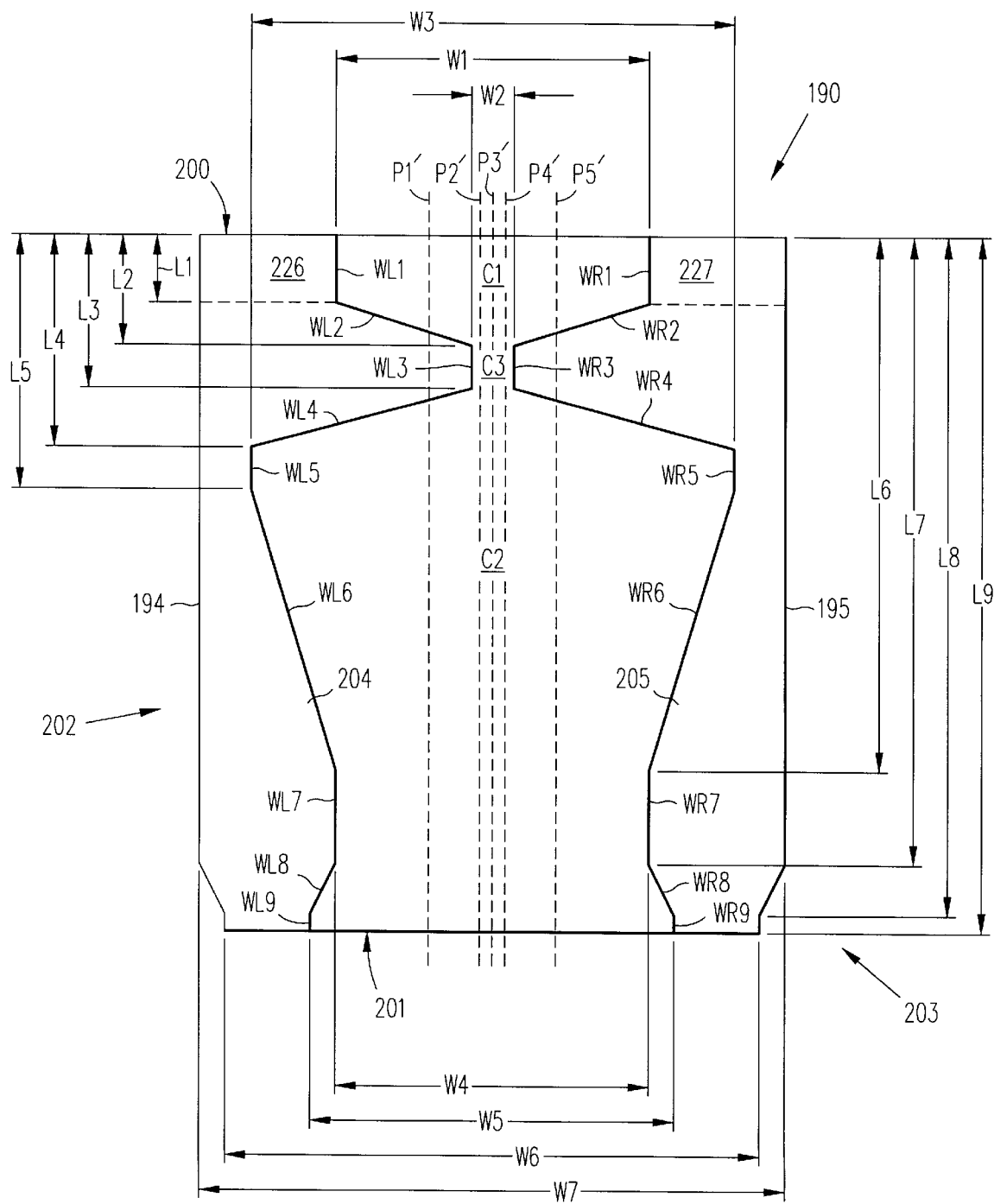
FIGS. 3a and 3b are bottom plan and perspective views, respectively, of a NPAB slider in accordance with a first embodiment of the invention.
Figure 3B:
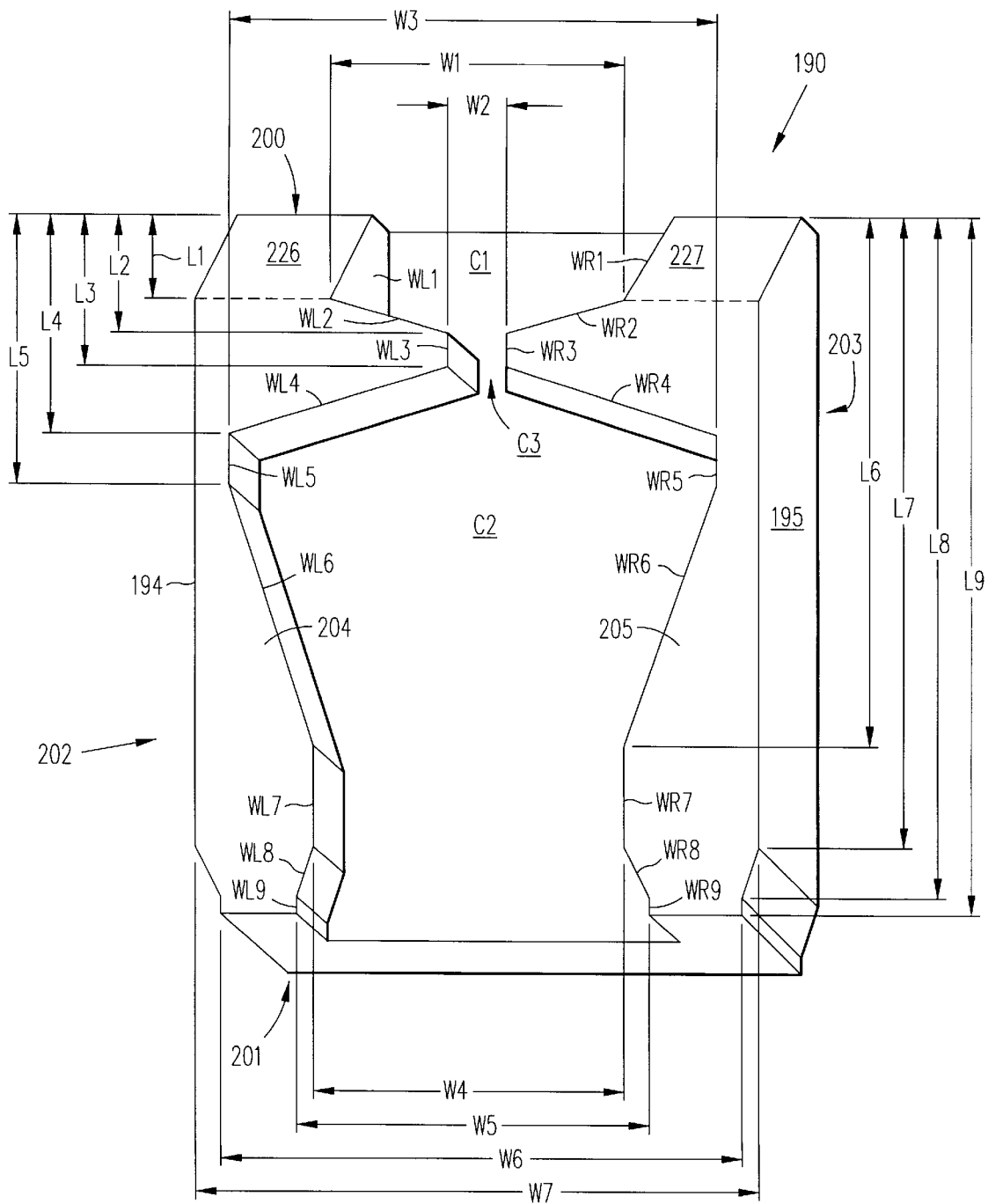

Description of the Structure of a Slider Including a Positive Pressure Region, a Negative Pressure Region and a Transition Region FIGS. 3a and 3b are bottom plan and perspective views, respectively, of a first embodiment of a NPAB slider 190 in accordance with the invention. NPAB slider 190 has a leading edge 200, a trailing edge 201, and first and second side edges 202, 203. Slider 190 has first and second raised side rails 204, 205 positioned along first and second side edges 202, 203, respectively. First and second raised side rails 204, 205 have outer rail edges 194, 195, respectively.

As shown in FIGS. 3a and 3b, first and second raised side rails 204, 205 have leading edge tapers 226, 227 for facilitating lift. First and second raised side rails 204, 205 in combination with leading edge 200 and trailing edge 201 define a recessed surface area. This recessed surface area is divided into three regions, i.e. a positive pressure region C1, a negative pressure region C2, and a transition region C3 where the transition from positive pressure in positive pressure region C1 to negative pressure in negative pressure region C2 occurs. All three regions C1, C2, C3 can be created in a single etch process step to the same etch depth of approximately 3 to 7 μm below the surfaces of first and second raised side rails 204, 205.

Positive pressure region C1 is defined further by leading edge 200, first and second walls WL1, WL2 of first raised side rail 204, and first and second walls WR1, WR2 of second raised side rail 205. As shown, first walls WL1 and WRI extend a distance L1 from leading edge 200 at a fixed width from each other shown as W1. Second walls WL2 and WR2 converge from width W1 (at a distance L1 from leading edge 200) to a width W2 (at a distance L2 from leading edge 200).

Negative pressure region C2 is defined by trailing edge 201, fourth WL4, fifth WL5, sixth WL6, seventh WL7, eighth WL8 and ninth WL9 walls of first raised side rail 204, and fourth WR4, fifth WR5, sixth WR6, seventh WR7, eighth WR8 and ninth WR9 walls of second raised side rail 205. Fourth walls WL4 and WR4 diverge from a width W2 (at a distance L3 from leading edge 200) to a width W3 (at a distance L4 from leading edge 200). Fifth walls WL5 and WR5 extend from a distance L4 to a distance L5 at a fixed width W3. Sixth walls WL6 and WR6 converge from a width W3 at a distance L5 to a width W4 at a distance L6. Seventh walls WL7 and WR7 extend from a distance L6 to a distance L7 at a fixed width W4. Eighth walls WL8 and WR8 diverge from a width W4 at a distance L7 to a width W5 at a distance L8. Ninth walls WL9 and WR9 extend from a distance L8 to a distance L9 at a fixed width W5.

Transition region C3 is defined by positive pressure region C1, negative pressure region C2, third wall WL3 of first raised side rail 204, and third wall WR3 of second raised side rail 205. As shown, third walls WL3 and WR3 extend from a distance L2 to a distance L3 at a fixed width W2.

Outer rail edges 194, 195 extend from leading edge 200 to a distance L7 at a fixed width W7. Outer rail edges 194, 195 then converge to a width W6 at a distance L8, then extend to trailing edge 201 at a fixed width W6. Thus, first and second raised side rails 204, 205 decrease in width from a distance L7 from leading edge 200 to a distance L8 from leading edge 200. The widths of first and second raised side rails 204, 205 are reduced at trailing edge 201 to reduce the potential contact area between slider 190 and the disk surface. Of importance, because sliders fly with their leading edge angled upward (the pitch angle), sliders are most likely to strike the disk during flight at the trailing edge of the rails. By making the portion of rails 204, 205 at trailing edge 201 narrow, the chance of slider 190 striking the disk is reduced. In one embodiment, the trailing edges of rails 204, 205 are tailored to the minimum width needed to mount magnetic transducers thereon.

The dimensions of embodiment 1 in microns (μm) are shown below in Table 1A and Table 1B.

TABLE 1A

EMBODIMENT 1 WIDTH DIMENSIONS (μm)

| W1 | W2 | W3 | W4 | W5 | W6 | W7 |
|---|---|---|---|---|---|---|
| 840 | 144 | 1380 | 820 | 1090 | 1450 | 1550 |

TABLE 1B

EMBODIMENT 1 LENGTH DIMENSIONS (μm)

| L1 | L2 | L3 | L4 | L5 | L6 | L7 | L8 | L9 |
|---|---|---|---|---|---|---|---|---|
| 300 | 400 | 565 | 585 | 775 | 1575 | 1850 | 1982 | 2032 |

Although raised side rails 204, 205 are symmetric, in other embodiments they are asymmetric. A magnetic transducer is typically positioned on the trailing edge of raised side rail 205, which is the outer rail. In other embodiments, the magnetic transducer is positioned on the trailing edge of raised side rail 204, which is the inner rail. In other embodiments, magnetic transducers are positioned on the trailing edges of both the inner and outer rails 204, 205, although only one magnetic transducer is used.

Also, although outer rail edges 194, 195 start converging at distance L7 from leading edge 200, in other embodiments, outer rail edges 194, 195 do not converge, and simply extend in a linear direction toward trailing edge 201. Likewise, in other embodiments, walls WL7, WR7 extend all the way to trailing edge 201.

The Manufacturing Process

Slider 190 is typically fabricated from a ceramic wafer by the following process. First, magnetic transducers are formed on the wafer surface, e.g. by vacuum-depositing the various layers used to form the transducers, and photolithographically patterning those layers. Vacuum-deposition can be accomplished by sputtering or evaporation.

The wafer is then cut into bars by methods well known in the art. The bars are cut such that a row of transducers are contained on a surface of each bar. Thereafter, a mask is applied to the bar to define the recessed surface areas, i.e. positive, negative and transition regions C1, C2 and C3, respectively. (Regions C1 to C3 are etched into a surface of the bar which is at a right angle to the surface on which the transducers are formed.) In one embodiment, the masking is accomplished photolithographically, using positive or negative photoresist. In other words, photoresist is deposited on the bar, selectively exposed to light, and developed, thereby removing the portion of the resist over the areas where regions C1, C2 and C3 are to be formed. (The resist used to define regions C1 to C3, as well as the resist used to define the transducers, can also be patterned using other means, such as an e-beam.)

The exposed areas of the bar (i.e. where regions C1 to C3 are to be formed) are then etched, e.g. by ion milling, reactive ion etching, laser etching or other appropriate processes. By appropriately masking and etching, several sliders are formed simultaneously on a single bar.

Figure 3C:
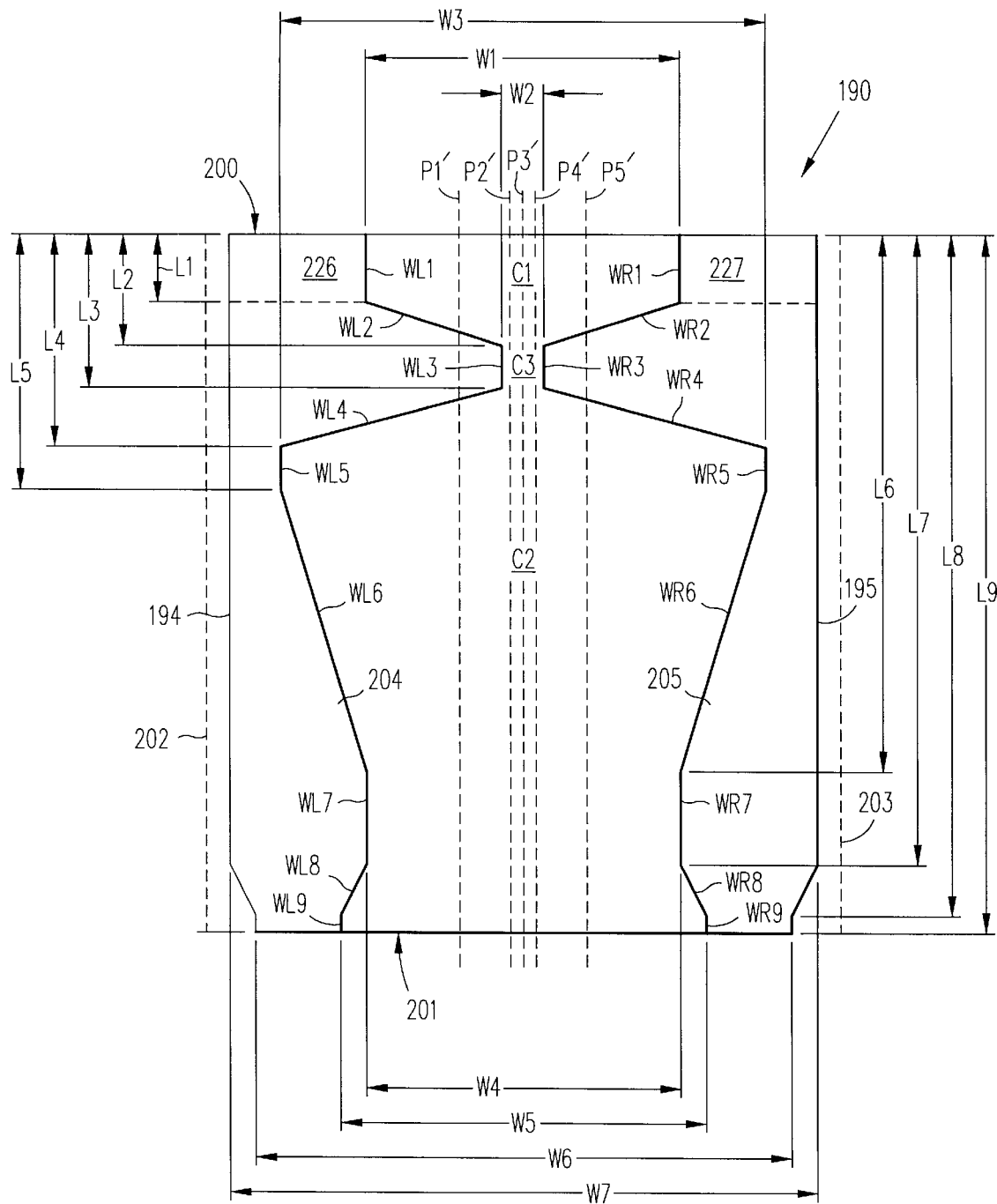
FIGS. 3c and 3d are bottom plan and perspective views, respectively, of a NAPB slider in accordance with the invention in which the outer rail edges are not directly coincident with the side edges of the NPAB slider.
Figure 3D:
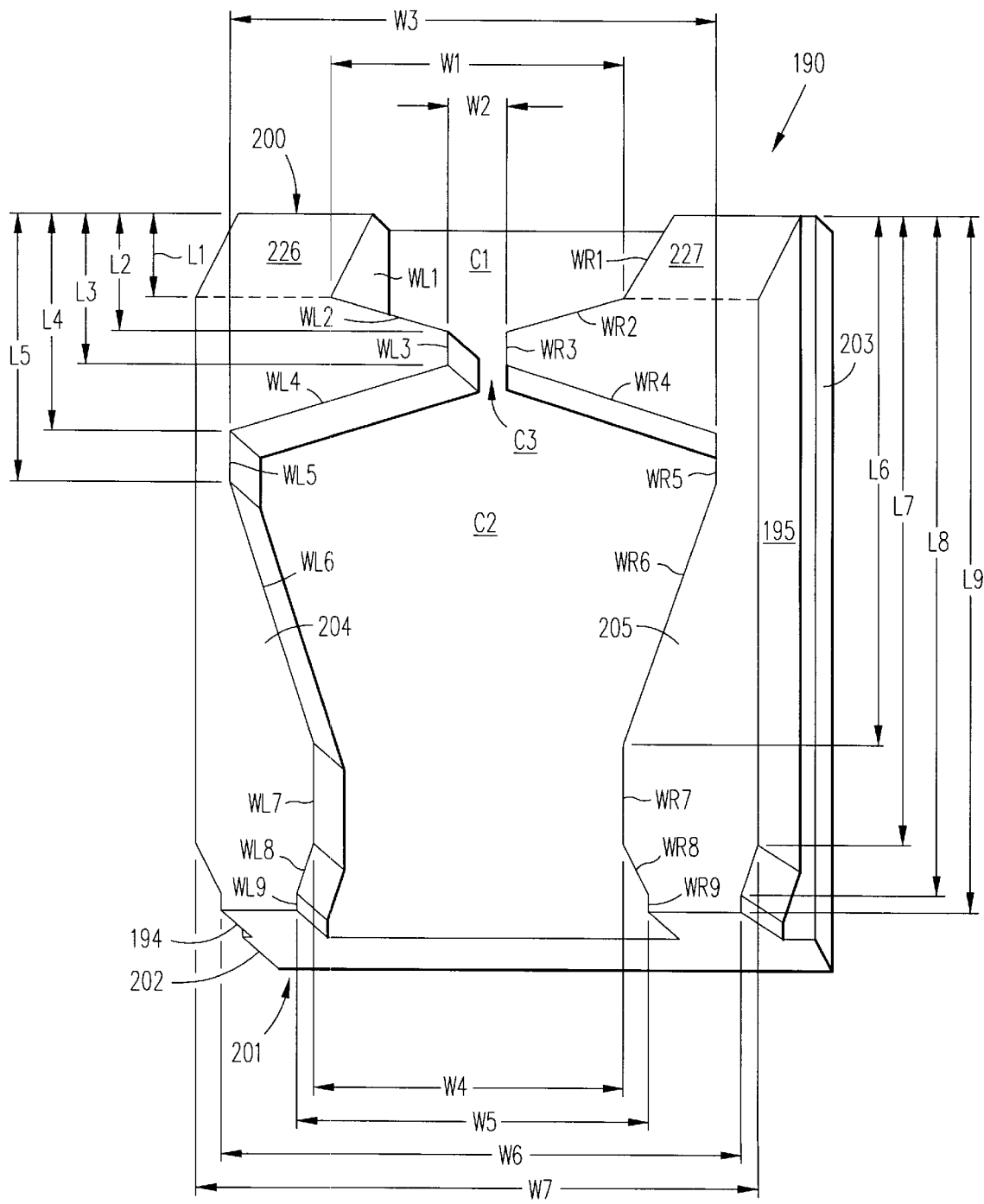

The sliders are then cut from the bar. Although not shown in FIGS. 3a and 3b, or in tables 1A and 1B, there is typically some distance (e.g. between 10 $\mu$m and 50 $\mu$m) between outer rail edges 194, 195 and first and second side edges 202, 203 of slider 190, respectively (e.g., as shown in FIGS. 3c and 3d). This provides a measure of tolerance to prevent damage to first and second raised side rails 204, 205 when the bar is cut into individual sliders during manufacturing.

Air Pressure Distribution Underneath the NPAB Slider During Use

Figure 4:
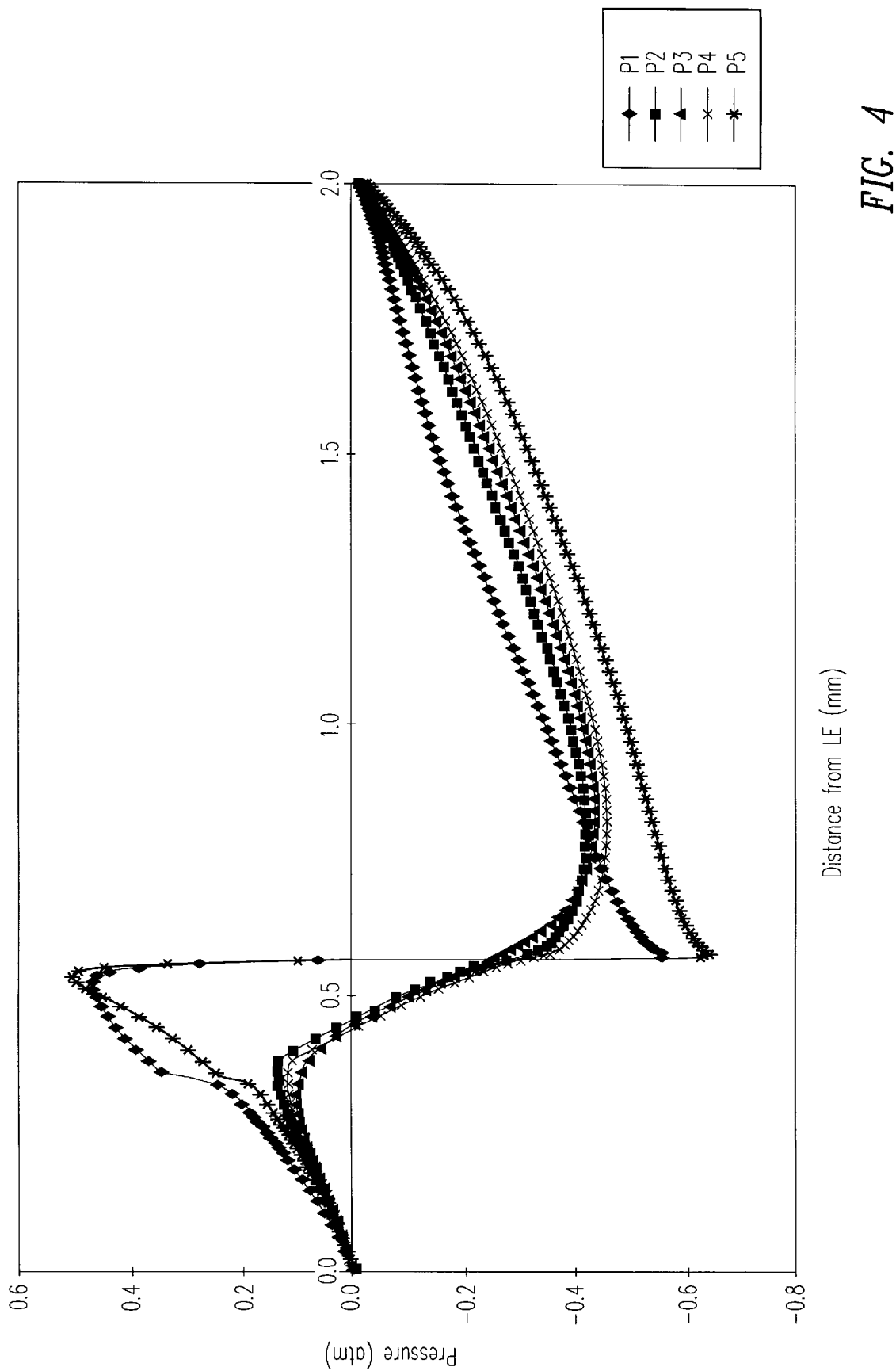
FIG. 4 shows graphs of pressure along the length of the slider of FIGS. 3a and 3b.

During use, air flows into positive pressure region C1. Thereafter, air goes from positive pressure region C1 to negative pressure region C2 via two pathways. First, air passes from positive pressure region C1 to negative pressure region C2 through transition region C3. Second, air passes from positive pressure region C1 to negative pressure region C2 by passing over second walls WL2, WR2. FIG. 4 shows graphs of pressure versus slider length. In FIG. 4, curves P1 to P5 show the pressure from leading edge 200 to trailing edge 201 along dashed lines P1' to P5' in FIG. 3a, respectively. As shown, dashed lines P2' to P4' follow the first pathway through transition region C3. Dashed lines P1' and P5' follow the second pathway over second walls WL2, WR2.

As seen in FIG. 4, the pressure is positive and increases from leading edge 200 in positive pressure region C1. The pressure is negative and decreases (i.e. becomes more negative) from trailing edge 201 towards leading edge 200 in negative pressure region C2. The pressure transitions from positive pressure to negative pressure in between positive pressure region C1 and negative pressure region C2. In particular, as illustrated by curves P2, P3 and P4, the pressure transitions from positive pressure to negative pressure in transition region C3. In curves P1, P5, a spike in positive pressure occurs approximately 400 $\mu$m from leading edge 200 as a result of the rapid compression of air as it encounters second walls WL2, WR2, respectively.

During use, negative pressure is generated in negative pressure region C2. The magnitude and distribution of negative pressure is controlled by the shapes of regions C1 to C3. Of importance, slider 190 lends itself to modifications of the shapes of regions C1 to C3 to tailor parameters such as roll, pitch, skew sensitivity and fly height.

Tailoring Fly Height By Shaping Negative Pressure and Transition Regions C2, C3

Sliders in which the width W2 of transition region C3 is reduced, or in which the length of transition region C3 (L3 minus L2) is increased, allow less air to vent from positive pressure region C1 to negative pressure region C2. These sliders exhibit more negative pressure in negative pressure region C2, which forces slider 190 downward towards the disk surface and thus decreases the fly height.

At a transition region width W2 less than approximately 3% of the air bearing surface (ABS) width W7 (1550 $\mu$m), the amount of air allowed into negative pressure region C2 through transition region C3 is so small that it has no significant effect on the negative pressure in negative pressure region C2 at high disk speeds. (W7 is the distance between outer rail edges 194 and 195. See FIGS. 3a and 3b.) Thus, for transition region widths W2 less than approximately 3% of the ABS width W7, a change in width W2 will not have an appreciable effect on fly height. Furthermore, at transition region widths W2 less than approximately 3% of the ABS width W7, turbulence created in air flow through transition region C3 may cause instability in the slider flight characteristics. Also, reducing transition region width W2 increases the likelihood that any debris entering positive pressure region C1 will get caught in transition region C3. (Since there is no obstruction in regions C1, C2, C3, debris entering slider 190 has little or no tendency to collect in these regions, but rather to pass through.) For the foregoing reasons, region C3 is greater than or equal to 3% of the ABS width W7, and preferably greater or equal to 5% of the ABS width W7.

In one embodiment the derivative of downward force on the slider caused by negative pressure region C2 with respect to width W2 of transition region C3 is greater than or equal to approximately 2% per 1% change in width W2. The derivative is typically less than approximately 10% per 1% change in width W2 and in some embodiments is less than 6% per 1% change in width W2.

Conversely, sliders in which the Width W2 of transition region C3 is increased, or in which the length of transition region C3 is decreased, allow more air to vent from positive pressure region C1 to negative pressure region C2. These sliders exhibit less negative pressure in negative pressure region C2, which increases the fly height. However, when the transition region width W2 becomes too large, the amount of air allowed into region C2 essentially eliminates negative pressure. Accordingly, region C3 typically has a width less than or equal to 25% of ABS width W7.

The fly height can also be tailored by changing the area of negative pressure region C2. By increasing the area of region C2 (for example, by increasing the width of region C2), more downward force is exerted on the slider which decreases the fly height. Conversely, by decreasing the area of region C2 (for example by decreasing the width of region C2), less downward force is exerted on the slider which increases the fly height. In the slider shown in FIGS. 3a and 3b (dimensions given in tables 1A, 1B), at the widest point of region C2, region C2 has a width W3 (1380 µm) which is approximately equal to 89% of ABS width W7.

Thus, the design of the present NPAB slider provides a convenient means of adjusting the fly height.

Tailoring Roll Characteristics By Shaping Positive Pressure, Negative Pressure and Transition Regions C1, C2 and C3

The design of the present NPAB slider facilitates control of the slider roll characteristics. The roll of the slider results from the pressure distribution acting on the slider. By controlling the shapes of regions C1 to C3, the direction of air flow into negative pressure region C2 is controlled, and thus the distribution of pressure and the slider roll characteristics are controlled.

Figure 5A:
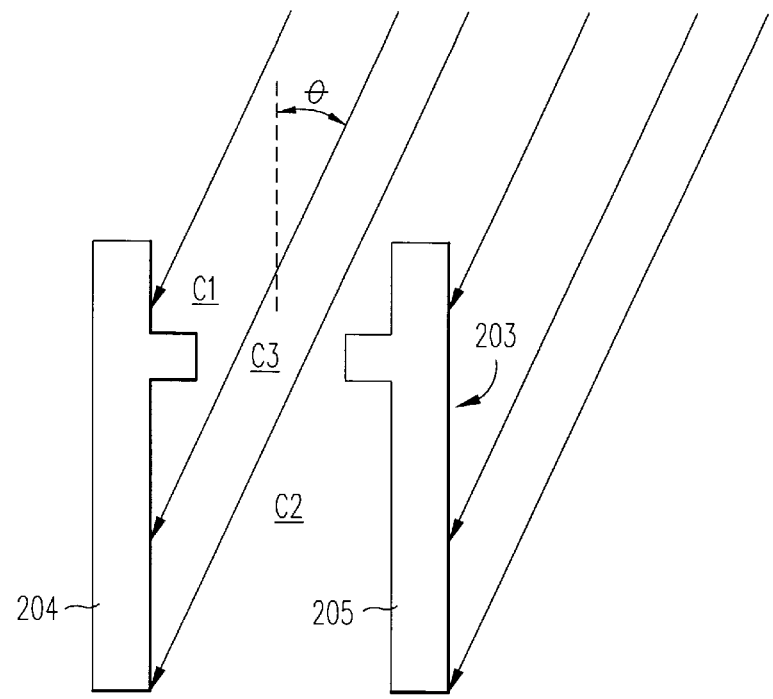
FIGS. 5a and 5b are bottom plan views of NPAB sliders in accordance with the invention with wide and narrow transition regions, respectively, showing air flow characteristics under skewed conditions.

By increasing the width of transition region C3, one can vary the direction of air flow through transition region C3 into negative pressure region C2. As shown in FIG. 5a, when flying at a skew angle θ, sliders having a wide transition region C3 direct air entering negative pressure region C2 towards downstream rail 204, and away from upstream rail 205. Thus less negative pressure is generated near downstream rail 204, and more negative pressure is generated near upstream rail 205. The overall negative pressure effect raises downstream rail 204 and lowers upstream rail 205, thereby partially offsetting roll caused by skew angle θ.

At transition region widths W2 greater than approximately 25% of the ABS width W7, the amount of air directed towards the downstream rail (204 in FIG. 5a) is so great that roll becomes excessive. Thus, it is desirable to keep the transition region width W2 less than or equal to approximately 25% of ABS width W7.

Figure 5B:
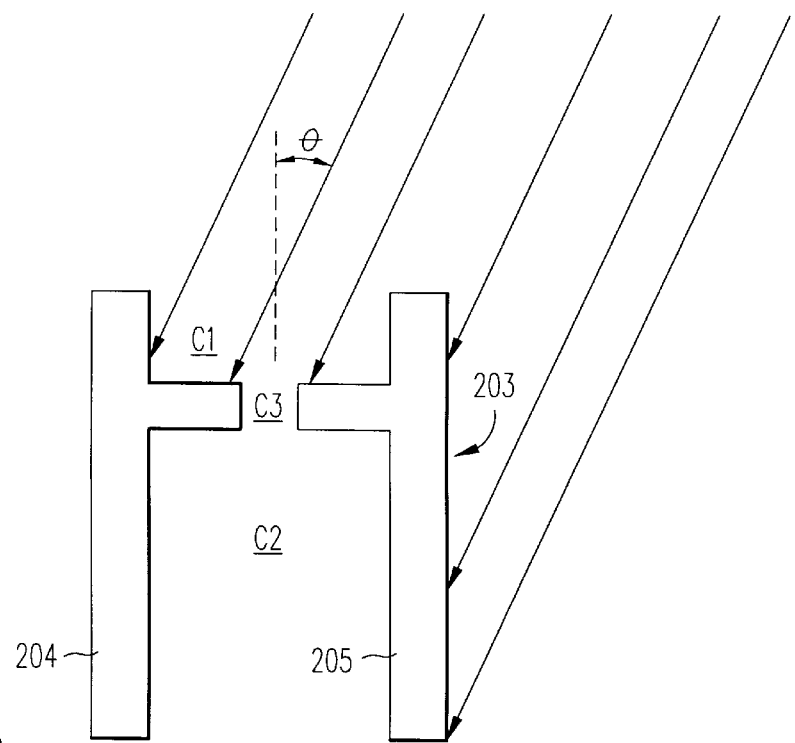

Conversely, sliders in which the width of transition region C3 is reduced allow less variation in the direction of air flow through transition region C3 and into negative pressure region C2. As shown in FIG. 5b, in sliders having a narrow transition region C3, skew angle θ has little effect on the direction of air flow into negative pressure region C2. This tends to equalize the negative pressure generated in negative pressure region C2 near upstream and downstream rails 205, 204. However, since upstream rail 205 receives air at ambient pressure from side 203, and downstream rail 204 receives little air from negative pressure region C2, the overall pressure effect raises upstream rail 205 and lowers downstream rail 204.

Of importance, by changing the shapes of positive pressure region C1 and/or negative pressure region C2, one can adjust the roll characteristics of the slider. For example, as shown in FIG. 6a for a slider flying at a skew angle θ having a partially funnel shaped positive pressure region C1, some of the air flow entering positive pressure region C1 is disrupted due to a region 71 and directed towards the center of negative pressure region C2.

Figure 6A:
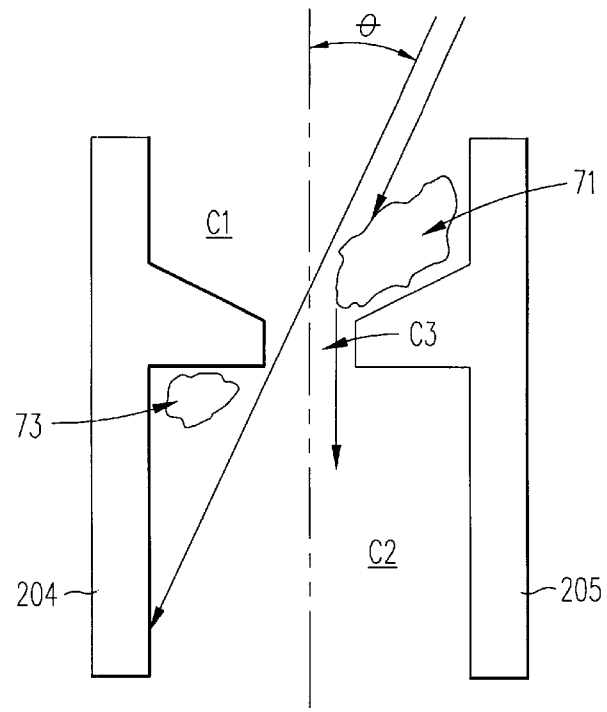
FIGS. 6a to 6d are bottom plan views of NPAB sliders in accordance with the invention with variously shaped positive and negative pressure regions showing air flow characteristics under skewed conditions.
Figure 6B:
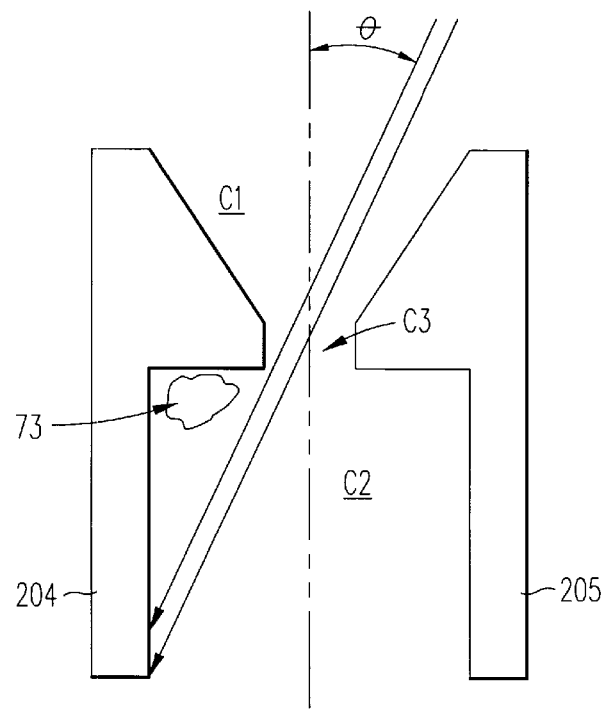

As shown in FIG. 6b, for a slider flying at the same skew angle θ, by shaping positive pressure region C1 with a "funnel" shape, more air flows through positive pressure region C1 without disruption which increases the amount of air directed towards downstream rail 204. Thus less negative pressure is generated near downstream rail 204, which raises downstream rail 204 as compared to the FIG. 6a slider.

Figure 6C:
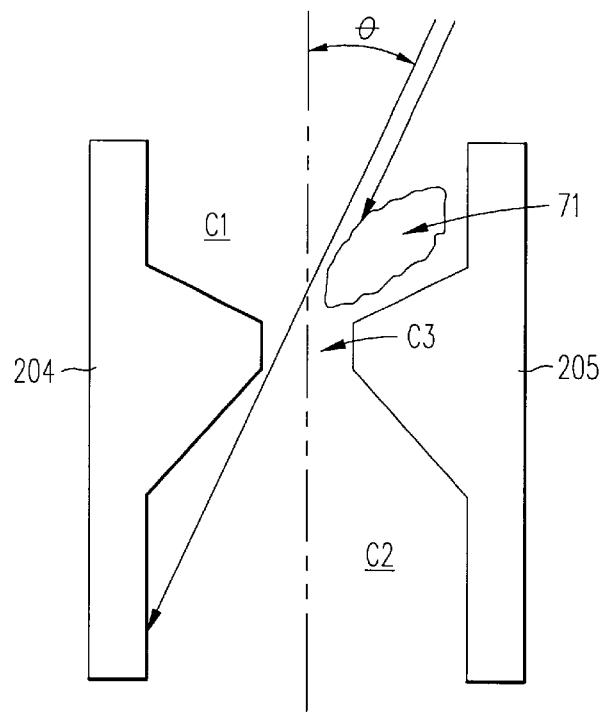

In FIGS. 6a and 6b, region 73 indicates a region of negative pressure. As shown in FIG. 6c, by shaping negative pressure region C2 with a funnel shape, region 73 is eliminated. Since region 73 is eliminated, less negative pressure is generated near downstream rail 204, which raises downstream rail 204 as compared to the FIG. 6a slider.

Figure 6D:
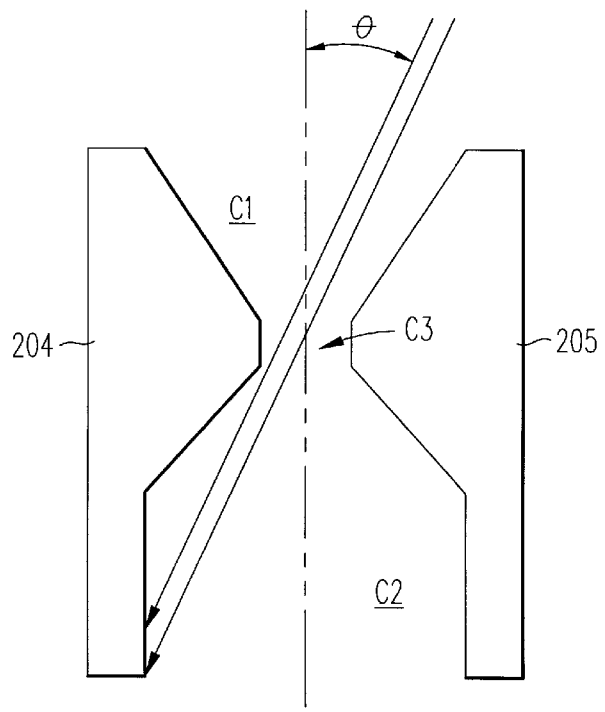

FIG. 6d shows a slider flying at the same skew angle θ in which both positive and negative pressure regions C1, C2 are funnel shaped. The funnel shaping of positive pressure region C1 directs more air towards downstream rail 204. The funnel shaping of negative pressure region C2 eliminates region 73 (FIGS. 6a, 6b). The combined effect raises downstream rail 204 as compared to sliders in FIGS. 6a to 6c.

FIGS. 6a to 6d demonstrate that by selectively shaping regions C1 and C2, roll characteristics can be controlled.

Tailoring Pitch By Adjusting the Width W1 of Positive Pressure Region C1

Referring to FIGS. 3a, 3b, slider 190 has leading edge tapers 226, 227 for facilitating lift at takeoff. The amount of lift created by tapers 226, 227, and hence the pitch of slider 190, can be controlled by adjusting the surface areas of tapers 226, 227.

The surface areas of tapers 226, 227 can be adjusted by varying width W1 of positive pressure region C1. By decreasing width W1, the surface areas of tapers 226, 227 are increased, which increases the pitch of slider 190. However, increasing the pitch can degrade the dynamic performance of slider 190 (because of reduced pitch stiffness), which can cause slider 190 to rock. Thus, when width W1 is less than approximately 5% of ABS width W7, pitch may become excessive.

Conversely, by increasing width W1, the surface areas of tapers 226, 227 are decreased, which decreases the pitch of slider 190. However, as the pitch is reduced, the tendency of asperities on the disk surface to contact slider 190 towards leading edge 200 increases (the potential contact surface area increases). Thus it is desirable to keep width W1 below approximately 70% of ABS width W7.

Although pitch can be readily tailored by adjusting width W1 of positive pressure region C1 within the range of approximately 5 to 70% of the ABS width W7, it is desirable to keep width W1 within the range of approximately 40 to 60% of ABS width W7 to maintain good slider performance.

Skew Performance of the Slider

Figure 1A:
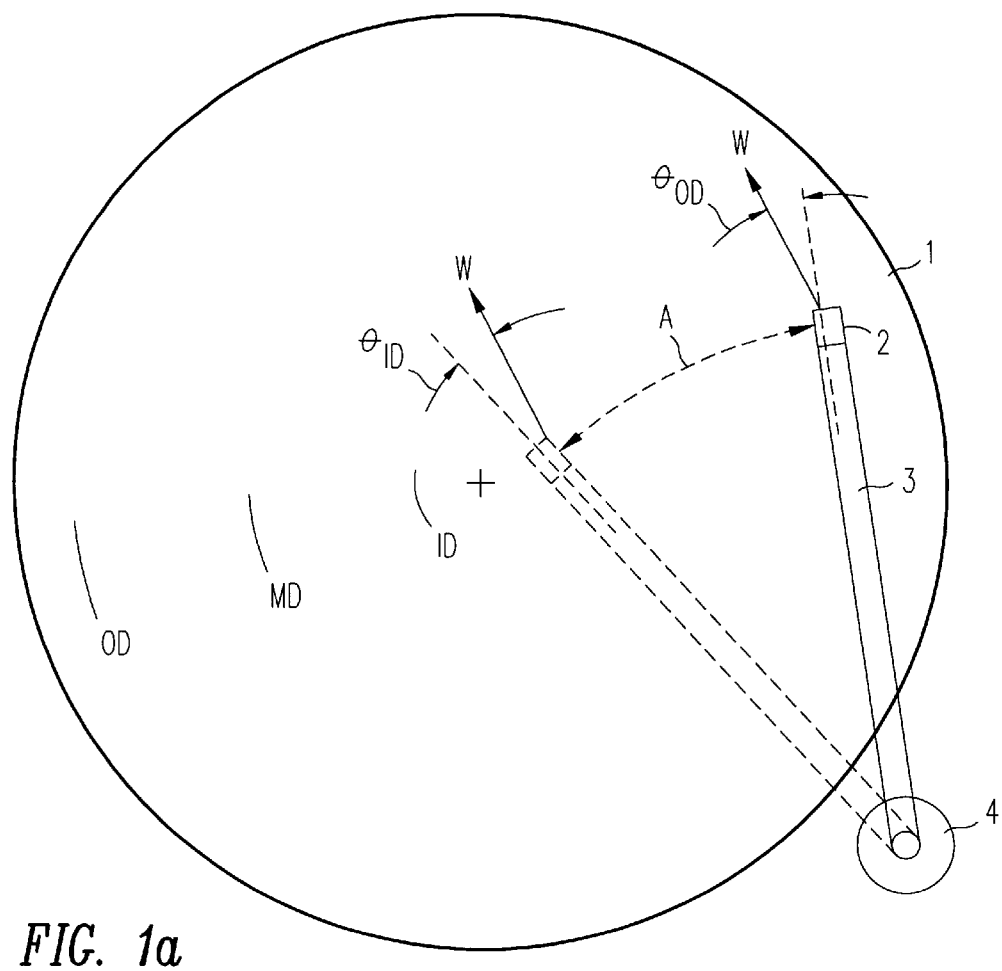
FIG. 1a is a schematic plan view of a magnetic disk storage system.
Figure 1B:
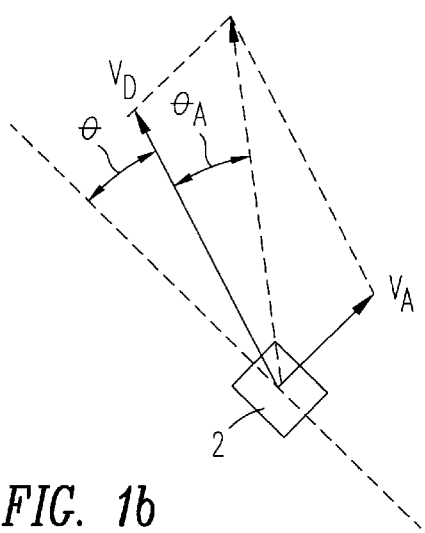
FIG. 1b is a vector diagram of a slider during accessing at the inner diameter of a disk.
Figure 2:
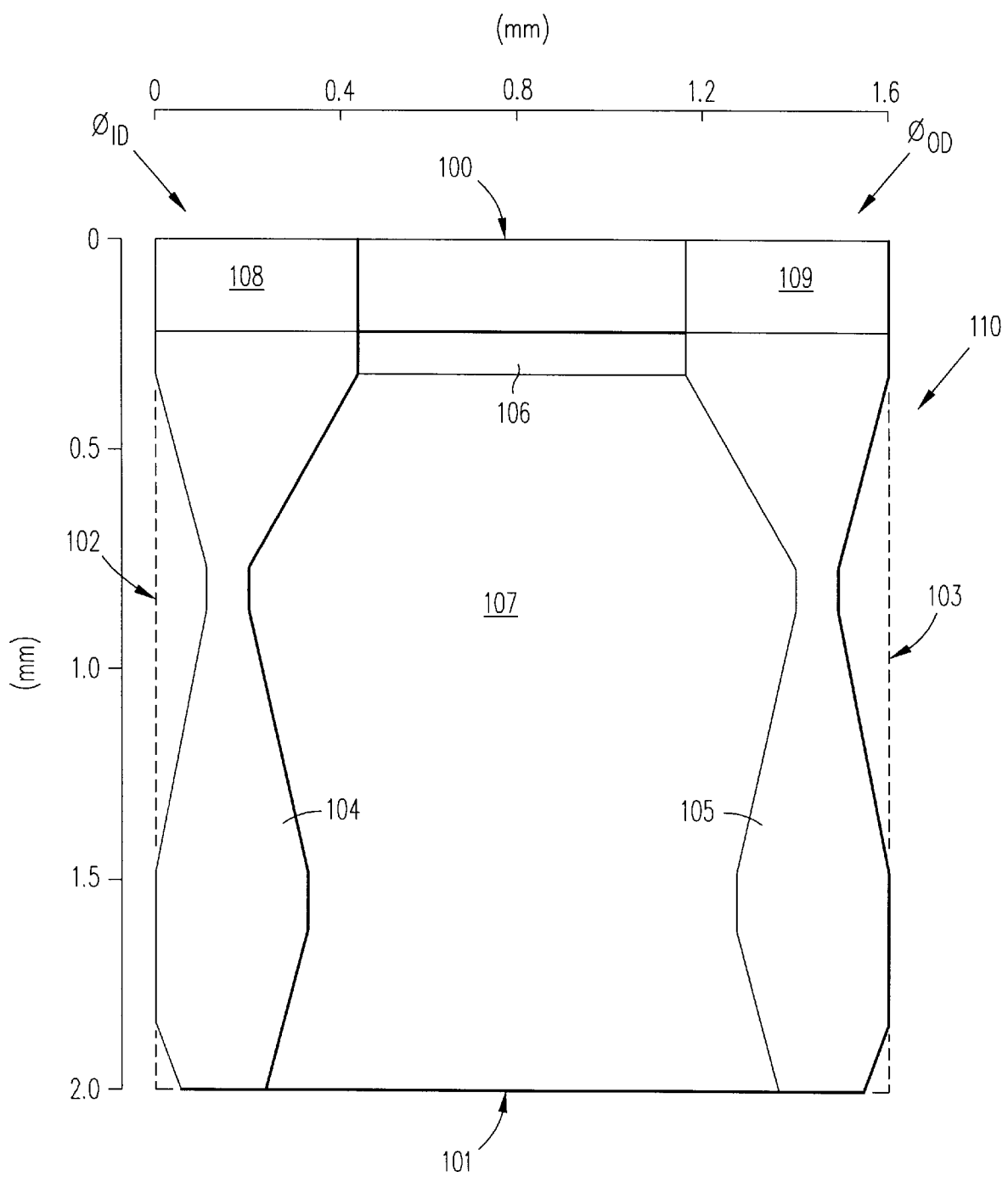
FIG. 2 is a bottom plan view of a prior art NPAB slider.
Figure 7:
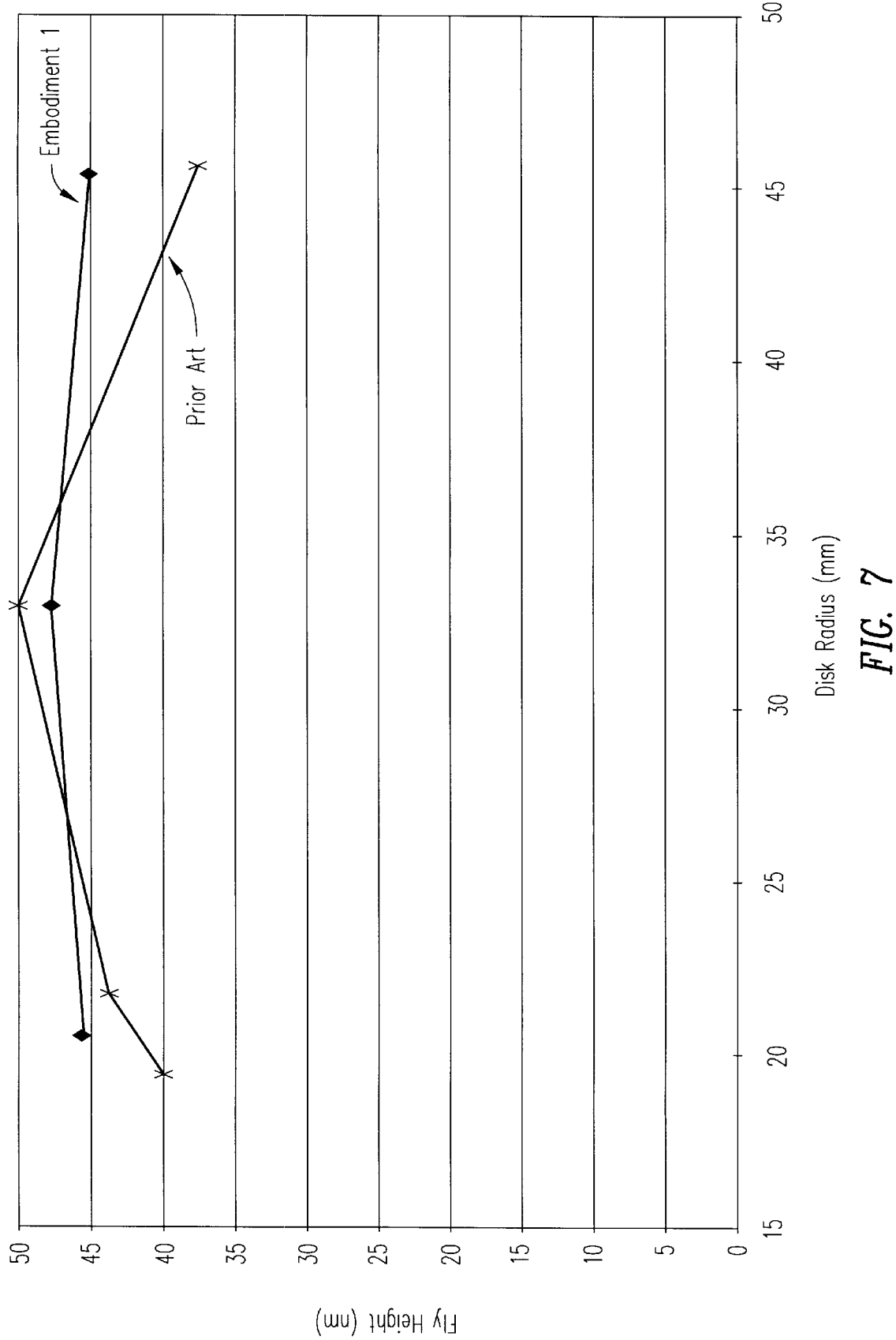
FIG. 7 is a comparison of the fly height profile for a NPAB slider in accordance with the invention and a prior art NPAB slider.

Simulation fly height in relation to slider position over the disk are plotted in FIG. 7 for embodiment 1 (shown in FIGS. 3a and 3b, having dimensions given in tables 1A and 1B) and the prior art NPAB slider shown in FIG. 2. The simulation was calculated for a 3½ inch diameter disk at 7200 RPM. The suspension preload for the prior art NPAB slider and embodiment 1 were 3.0 grams and 3.5 grams, respectively. As shown in FIG. 7, the fly height for embodiment 1 varies from about 45 to 48 nm for a variation of 3 nm over the disk surface. The fly height for the prior art NPAB slider varies from approximately 38 nm at OD to 50 nm at MD for a variation of 12 nm. Therefore, embodiment 1 exhibits superior fly height performance (i.e. less variation) compared to the prior art NPAB slider.

Figure 8:
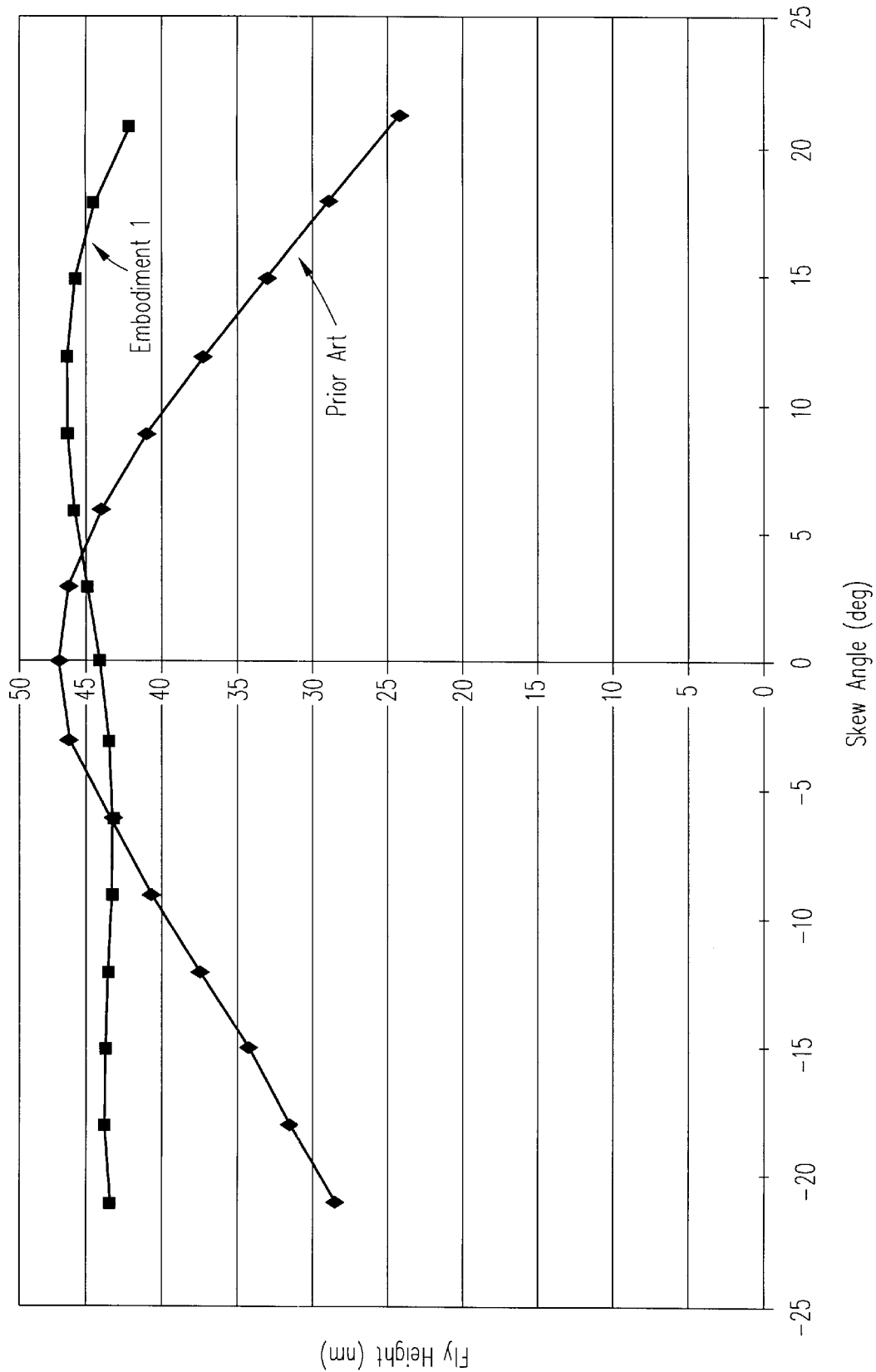
FIG. 8 is a comparison of the skew effects for a NPAB slider in accordance with the invention and a prior art NPAB slider.

Simulation fly height in relation to skew angle are plotted in FIG. 8 for embodiment 1 and the prior art NPAB slider shown in FIG. 2. The simulation results shown in FIG. 8 were calculated for skew angles ranging from −21 to +21 degrees at the inner diameter of a 3½ inch disk at 7200 RPM. The suspension preload for the prior art NPAB slider and embodiment 1 were 3.0 grams and 3.5 grams, respectively. As shown in FIG. 8, the fly height for embodiment 1 varies from 42 to 47 nm for a variation of 5 nm, for skew angles of −21 to +21 degrees. The prior art NPAB slider fly height varies from 24 to 47 nm for a variation of 23 nm. Therefore, embodiment 1 fly height is less sensitive to skew than the prior art NPAB slider.

Accessing performance is improved in sliders with less sensitivity to skew. The following example is provided as an illustration. At the inner diameter of a 3½" disk spinning at 7200 rpm ($V_D$=15 m/s), the skew angle is typically −6.0 degrees. During head seek (from OD to ID) at a −2 m/s access velocity ($V_A$) the slider is subjected to an access skew ($\theta_A$) which can be calculated from equation 1 set forth above. Specifically, $$\theta_A = \left(\text{ARCTAN}\left[\frac{15\text{Sin}(-6) + (-2)}{15\text{Cos}(-6)}\right]\right) - (-6)$$

which is approximately −7.5 degrees. The effective skew (skew+access skew) momentarily experienced by the slider during accessing is therefore −13.5 degrees. Thus, during head seek, the slider experiences a momentary change in effective skew from −6 to −13.5 degrees. Referring to FIG. 8, the fly height for the prior art NPAB slider will change from approximately 44 to 37 nm for changes in effective skew from −6 to −13.5 degrees, respectively, for a total drop of 7 nm. However, for embodiment 1, the fly height will only change from approximately 44 to 43 nm for the same change in effective skew from −6 to −13.5 degrees, respectively, for a total drop of approximately 1 nm. Thus embodiment 1 has superior accessing performance compared to the prior art NPAB slider.

Figure 9A:
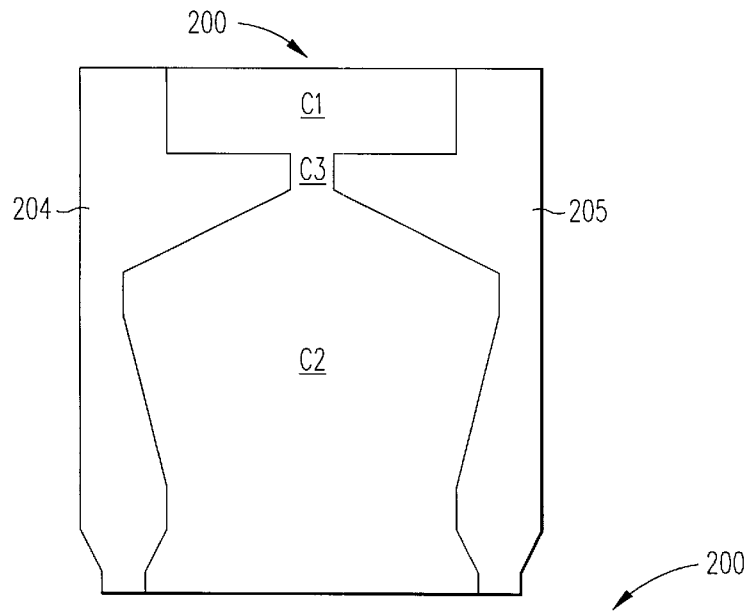
FIGS. 9a to 9f are bottom plan views of NPAB sliders having variously shaped positive and negative pressure regions in accordance with alternative embodiments of the invention.

Shown in FIGS. 9a to 9f are bottom plan views of alternative embodiments of a slider in accordance with the invention. FIG. 9a shows an embodiment with a rectangular positive pressure region C1 having a width much greater than the width of transition region C3. The relatively large width of rectangular positive pressure region C1 reduces the surface areas of the raised side rails 204, 205 at the leading edge 200 of the slider. The reduction in surface areas reduces lift at leading edge 200 of the slider, and hence reduces the pitch of the slider.

Figure 9B:
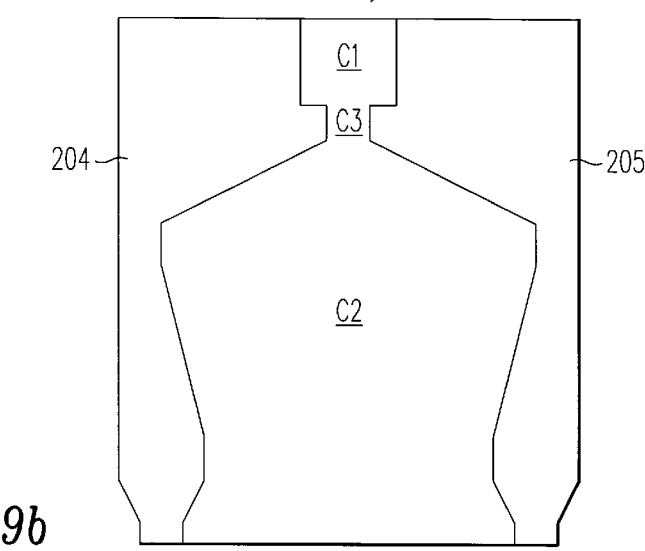

FIG. 9b shows an embodiment with a rectangular positive pressure region C1 which has a width slightly larger than the width of transition region C3. The relatively small width of positive pressure region C1 increases the surface areas of the raised side rails 204, 205 at leading edge 200 of the slider. This increases lift at leading edge 200 of the slider and hence increases the pitch of the slider.

Figure 9C:
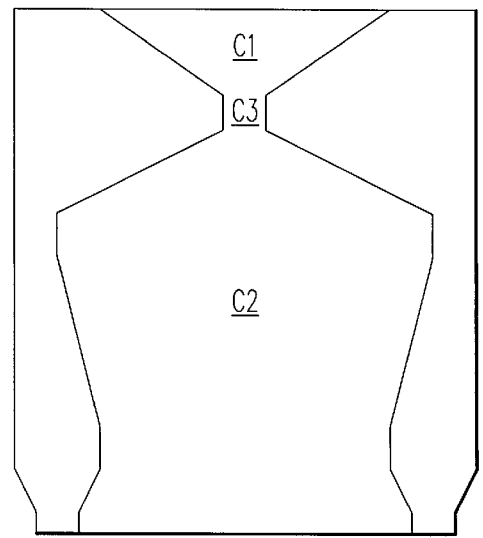

FIG. 9c shows an embodiment with a funnel shaped positive pressure region C1. When flying at skew, the funnel shaping increases the amount of air directed towards the downstream rail, which raises the downstream rail.

Figure 9D:
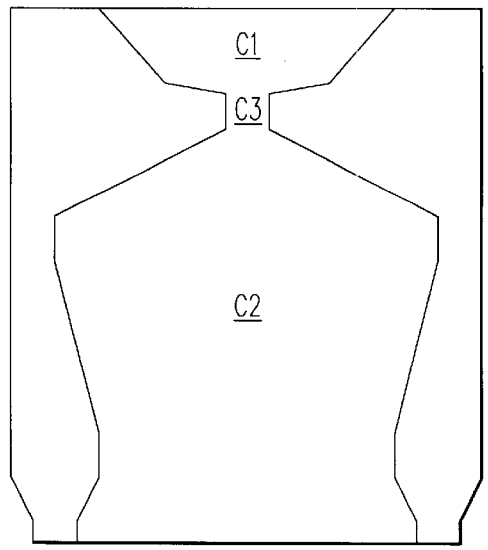

FIG. 9d shows an embodiment with a partially funnel shaped positive pressure region C1. When flying at skew, less air is directed towards the downstream rail in the FIG. 9d slider as compared to the FIG. 9c slider. Therefore, the downstream rail is raised less in the FIG. 9d slider than the FIG. 9c slider.

Figure 9E:
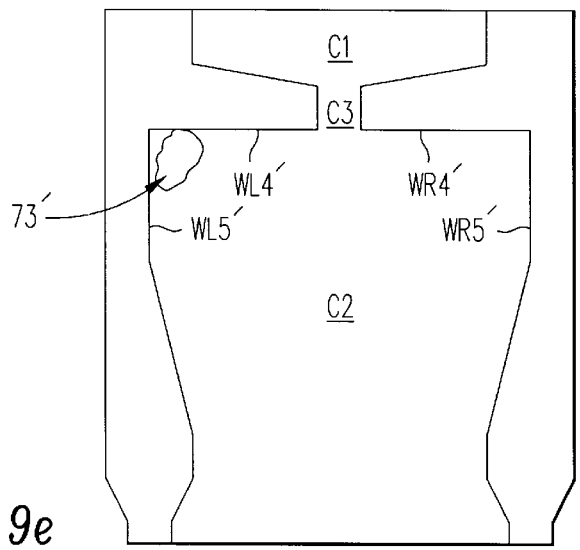

FIG. 9e shows an embodiment in which the leading walls WL4', WR4' are at right angles to sidewalls WL5', WR5' of negative pressure region C2. Shaping negative pressure region C2 in this manner increases the size of negative pressure region C2. This increases the amount of downward force created by negative pressure in region C2 which reduces the fly height of the slider. Further, when flying at skew, a region 73' of negative pressure (similar to region 73 in FIGS. 6a, 6b) increases the amount of downward force on the downstream rail, which causes the downstream rail to fly lower.

Figure 9F:
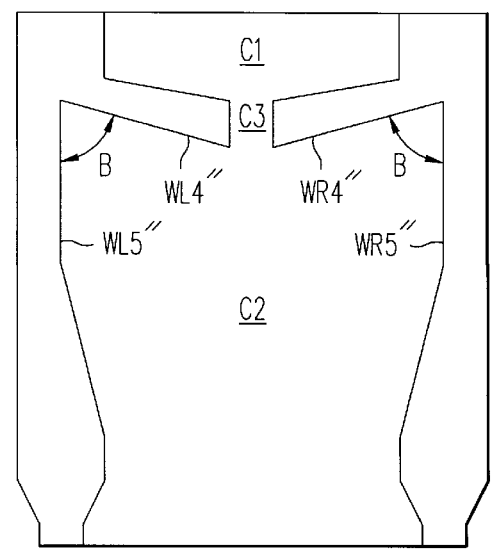

FIG. 9f shows an embodiment in which the leading walls WL4", WR4" of negative pressure region C2 form an angle B with sidewalls WL5", WR5" which is less than 90°. The FIG. 9f slider performs similar to the FIG. 9e slider, except that fly height is further reduced in the FIG. 9F slider since negative pressure region C2 is larger than negative pressure region C2 in the FIG. 9e slider.

Three Rail Embodiments

Figure 10A:
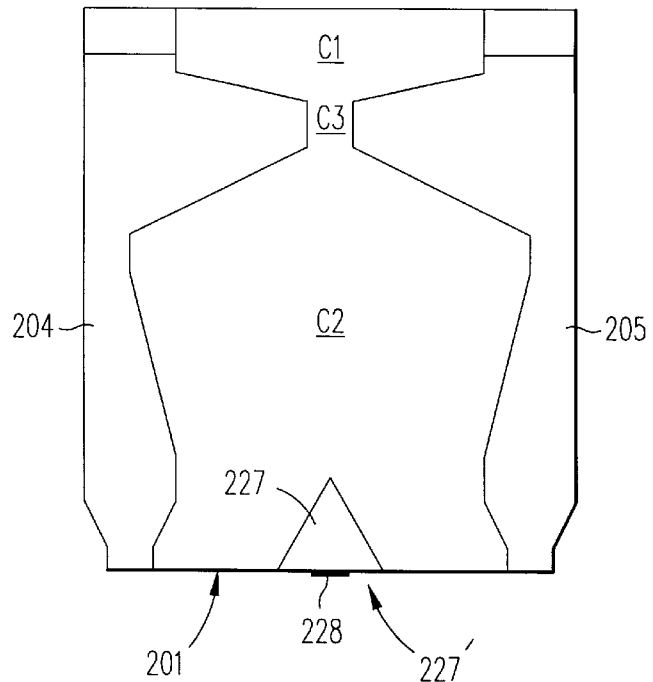
FIGS. 10a and 10b are bottom plan and perspective views, respectively, of a NPAB slider which includes a third rail in accordance with an alternative embodiment of the invention.
Figure 10B:
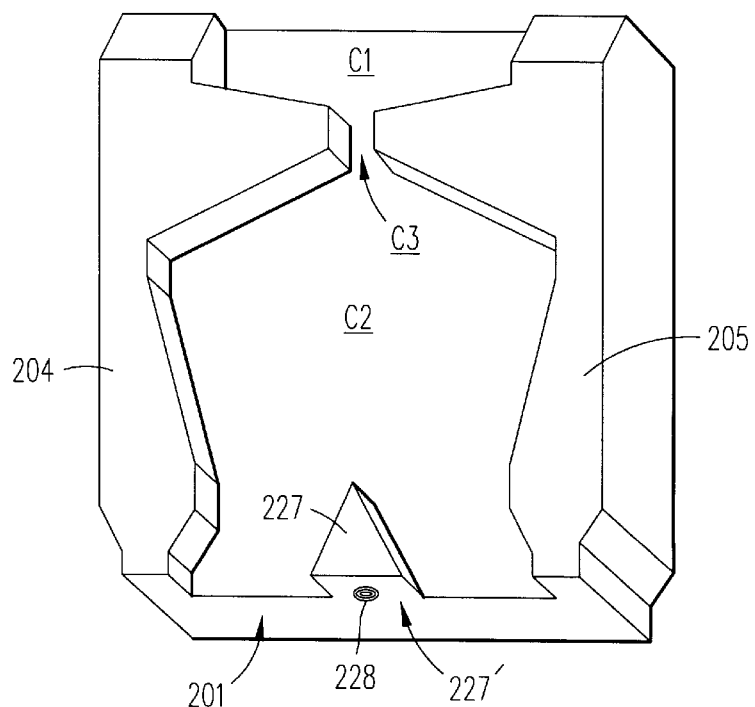

FIG. 10a and 10b are bottom plan and perspective views, respectively, of a NPAB slider in accordance with an alternative embodiment of the invention which includes a third rail 227 located near the center of trailing edge 201 of negative pressure region C2. A transducer 228 can be positioned on the trailing edge surface 227' of third rail 227 near the center of the slider width. (Alternatively, transducer 228 can be positioned on the trailing edge surface of first or second raised side rails 204, 205.) The trirail NPAB design shown, where transducer 228 is positioned on trailing edge surface 227' of third rail 227 at the center of the slider width, offers several advantages.

Figure 11A:
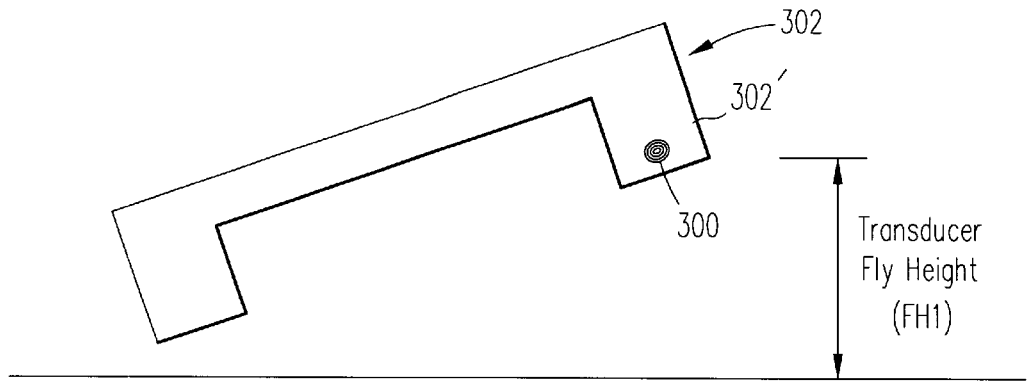
FIGS. 11a and 11b show fly height variations of a two rail slider in response to roll.
Figure 11B:
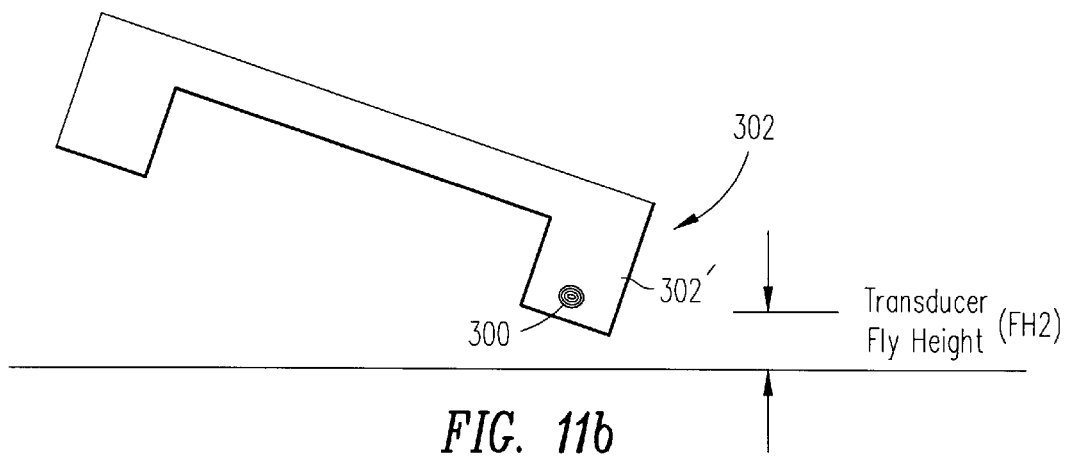
Figure 12:
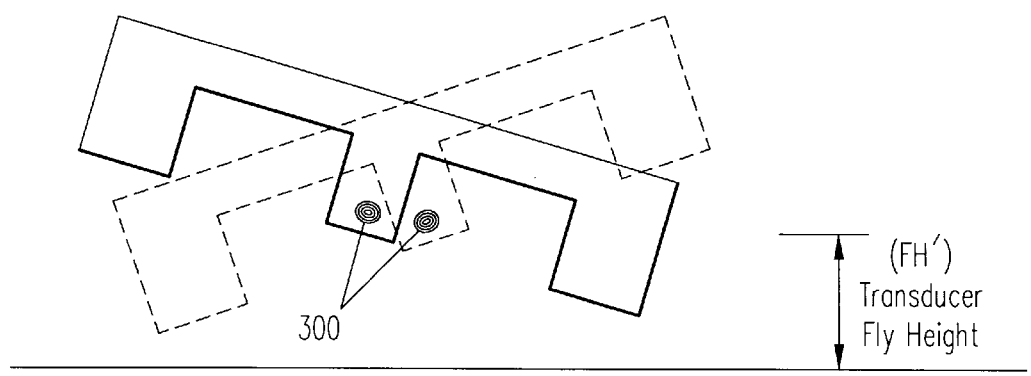
FIG. 12 shows fly height variations of a trirail slider in response to roll.

A significant advantage is the relative insensitivity of the transducer fly height to roll. Referring to FIGS. 11a and 11b, a transducer 300 in two rail sliders is typically mounted on a trailing edge surface 302' of an outer rail 302. The fly height of transducer 300 varies from a first fly height (shown as FH1 in FIG. 11a) to a second fly height (shown as FH2 in FIG. 11b) depending on slider roll. However, mounting transducer 300 on the trailing edge surface of the center rail of the trirail slider, as shown in FIG. 12, approximately aligns transducer 300 with the roll axis of the slider. This minimizes any variation in fly height FH' (measured at the transducer) in response to roll.

Another advantage of the trirail NPAB slider in which a single transducer is formed of the center rail in accordance with the invention is that the trirail NPAB slider can readily be used as an up-facing or down-facing slider. In two rail sliders, the transducer is typically located on the outer rail (the rail nearest to the outer diameter of the disk). For any given slider, the determination of which rail is the outer rail depends upon whether the slider is up-facing or down-facing. Thus, to accommodate use as an up-facing or down-facing slider, two rail sliders typically have transducers formed on both rails, i.e. two transducers are formed, although only a single transducer is used. However, by forming the transducer on the center rail, the necessity of forming two transducers for up-facing and down-facing sliders is eliminated. Further, as slider dimensions are reduced, the area available for forming transducers is correspondingly reduced. Thus, the trirail NPAB slider, wherein only a single transducer is formed, is particularly well suited for small sliders.

Figure 13A:
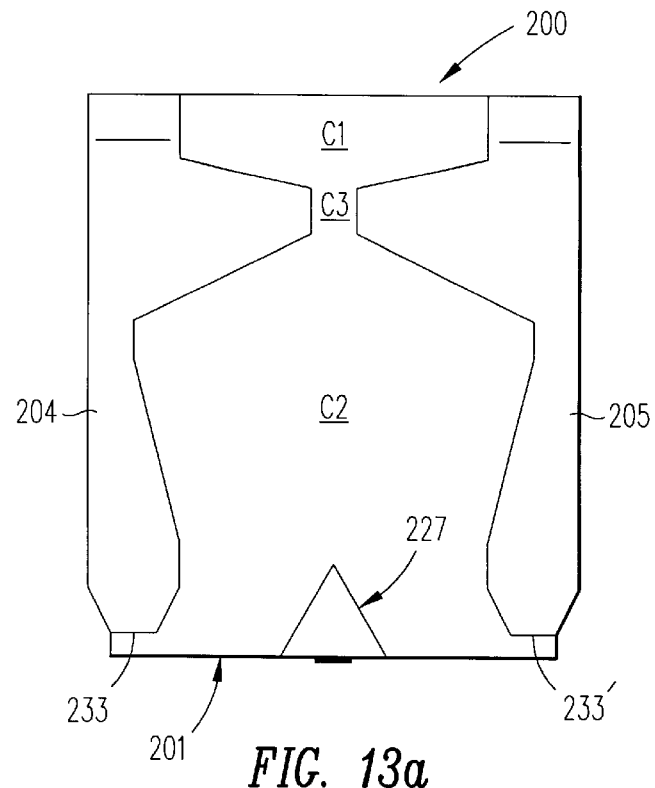
FIGS. 13a and 13b are bottom plan and perspective views, respectively, of a trirail NPAB slider wherein the raised side rails end prior to reaching the trailing edge of the slider in accordance with an alternative embodiment of the invention.
Figure 13B:
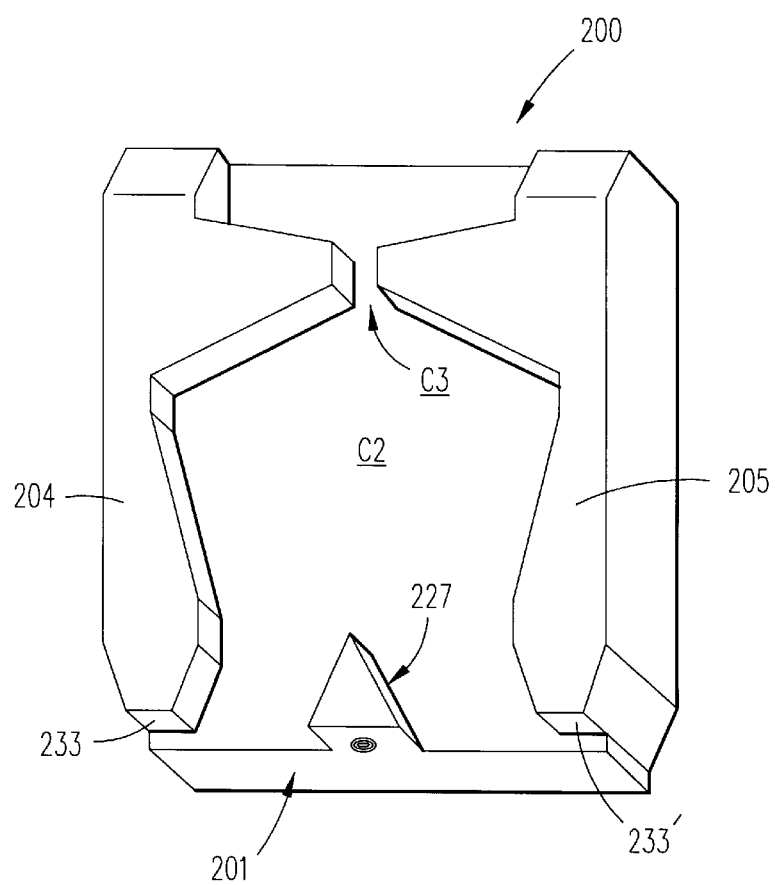

FIGS. 13a and 13b show a trirail NPAB slider in accordance with another embodiment of the invention where the first and second raised side rails 204, 205 extend from leading edge 200 to central regions 233, 233', respectively, and end before reaching trailing edge 201 of the slider. This design reduces the risk of contact between first and second raised side rails 204, 205 and the disk, or "head crash". (This is because the most likely location of such contact is at the trailing edge of the rails, since this is the portion of the slider that is closest to the disk.)

Embodiments Including Leading Edge Steps in Lieu of Leading Edge Tapers

Figure 14A:
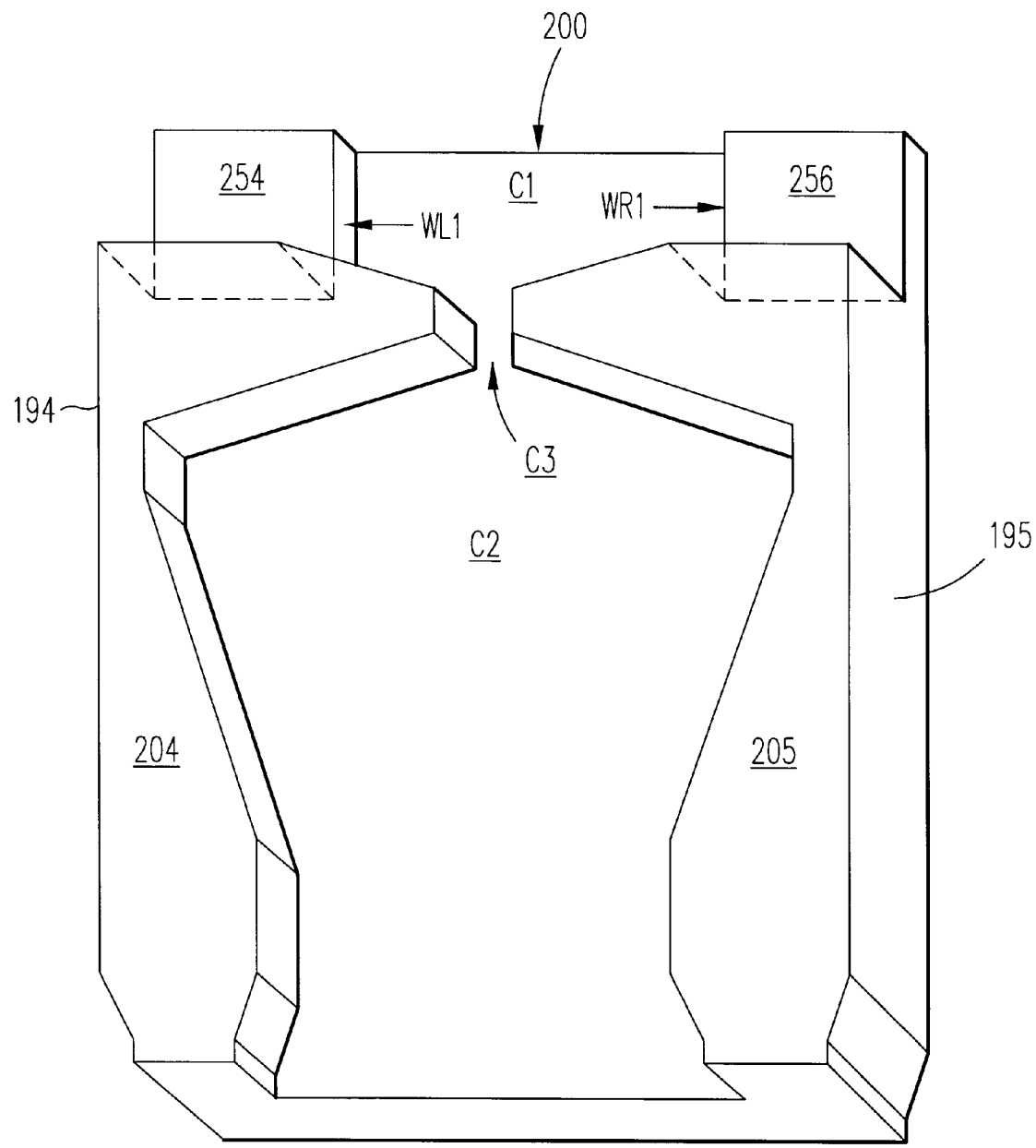
FIG. 14a is a perspective view of a NPAB slider wherein the leading edge tapers have been replaced with leading edge steps in accordance with an alternative embodiment of the invention.

FIG. 14*a* shows a bottom perspective view, and FIGS. 14*b* to 14*e* show bottom plan views of alternative embodiments of NPAB sliders in accordance with the invention where the leading edge tapers (226 and 227 in FIG. 3*a* and 3*b*) are replaced with leading edge steps. Steps 254, 256 in FIG. 14*a* are rectangular with leading edge 200, outer rail edges 194, 195, and walls WL1, WR1 forming three sides of each step, respectively. Steps 254, 256 function in a manner similar to leading edge tapers 226, 227 (FIGS. 3*a* and 3*b*), but as mentioned below, steps 254, 256 are more easily manufactured with precision than tapers 226, 227.

Figure 14B:
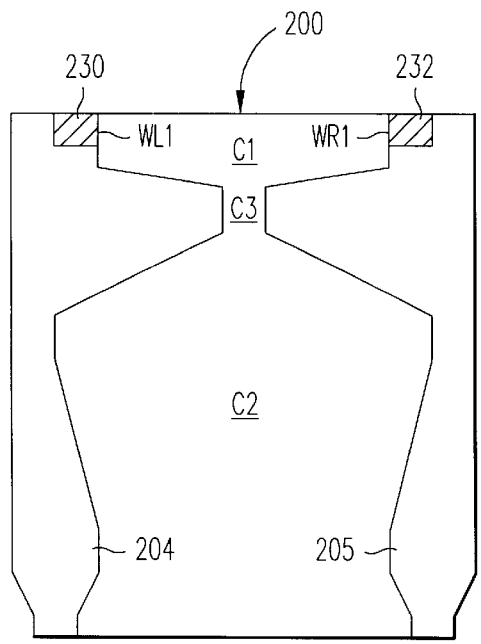
FIGS. 14b to 14e are bottom plan views of NPAB sliders wherein the leading edge tapers have been replaced with variously shaped leading edge steps in accordance with alternative embodiments of the invention.

Steps 230, 232 in FIG. 14*b* are rectangular with leading edge 200 and walls WL1, WR1 forming two sides of each step, respectively. When flying at skew, the downstream step forms a pocket which captures air. Thus, more positive pressure is generated at the downstream step as compared to the upstream step, which lifts the downstream rail.

Figure 14C:
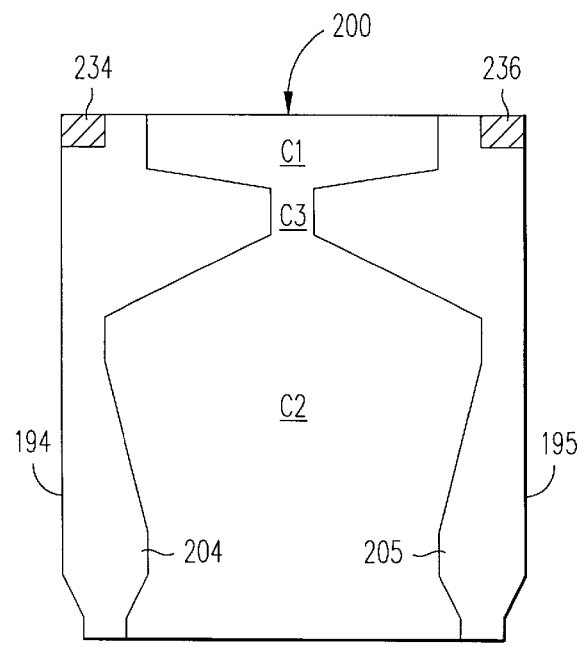

Steps 234, 236 in FIG. 14*c* are also rectangular with leading edge 200 and outer rail edges 194, 195 forming two sides of each step, respectively. When flying at skew, the upstream step forms a pocket which captures air. Thus, more positive pressure is generated at the upstream step as compared to the downstream step, which lifts the upstream rail.

Figure 14D:
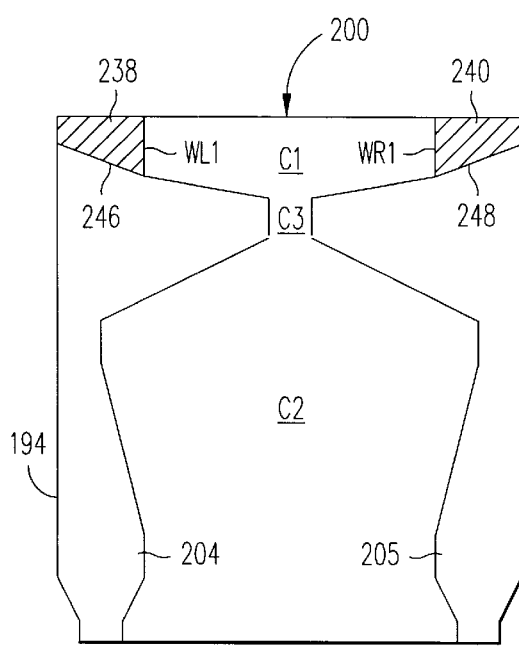

Steps 238, 240 in FIGS. 14*d* have three sides formed by leading edge 200, walls WL1, WR1, and outer rail edges 194, 195, respectively. As shown, the lengths of the sides formed by walls WL1, WR1 are greater than the lengths of sides formed by outer rail edges 194, 195, respectively. Thus, the inner step edges 246, 248 are angled, i.e. not parallel to leading edge 200. Similar to the FIG. 14*b* slider, when flying at skew the downstream step in the FIG. 14*d* slider has a tendency to capture air, but to a lesser extent than the FIG. 14*b* slider. Thus, more positive pressure is generated at the downstream step than the upstream step, which lifts the downstream rail, but to a lesser extent than in the FIG. 14*b* slider.

Figure 14E:
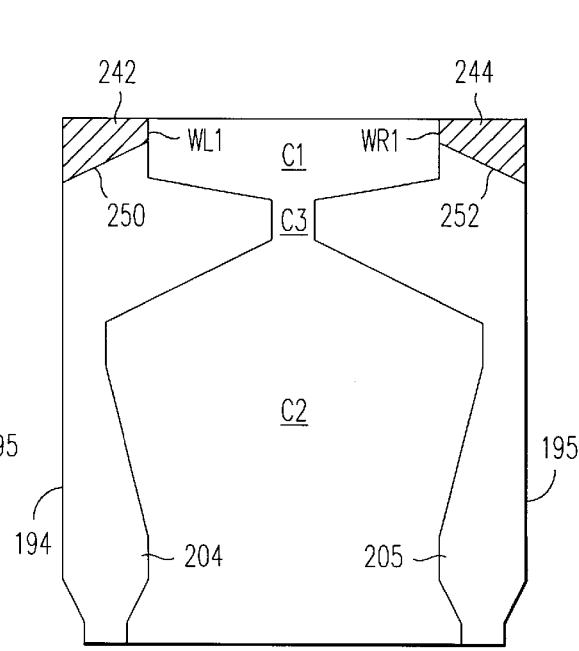

Steps 242, 244 in FIG. 14*e* have three edges formed by leading edge 200, walls WL1, WR1, and outer rail edges 194, 195, respectively. As shown, the lengths of sides formed by outer rail edges 194, 195 are greater than the lengths of sides formed by walls WL1, WR1, respectively. Thus, the inner step edges 250, 252 are angled, i.e. not parallel to leading edge 200. Similar to the FIG. 14*c* slider, when flying at skew the upstream step in the FIG. 14*e* slider has a tendency to capture air, but to a lesser extent than in the FIG. 14*c* slider. Thus, more positive pressure is generated at the upstream step as compared to the downstream step, which lifts the upstream rail, but to a lesser extent than in the FIG. 14*c* slider.

In the sliders shown in FIGS. 14*b* to 14*e*, each step preferentially directs air entering the step towards the inner or outer edge of the rail upon which the step is situated. To illustrate, in FIGS. 14*b* and 14*d*, steps 230 and 238 preferentially direct air towards the inner edge of rail 204, respectively, i.e. steps 230 and 238 preferentially direct air towards positive pressure region C1. To further illustrate, in FIGS. 14*c* and 14*e*, steps 234 and 242 preferentially direct air towards outer edge 194. Although the sliders shown in FIGS. 14*b* to 14*e* are symmetrical, in other embodiments they are asymmetrical. For example, on one rail a step can be formed which directs air towards the outer rail edge and on the other rail a step can be formed which directs air towards the inner rail edge.

The step edges in the sliders shown in FIGS. 14*a* to 14*e* are straight. However, in other embodiments, the step edges are not straight, for example, the step edges are concave, convex, curved, or are a series of straight lines connected at various angles. Further, the steps can have greater than four sides, or less than four sides, for example, the steps can be triangular. Accordingly, such modifications come within this invention.

The step depths in FIGS. 14*a* to 14*e* are typically in the range of 0.2 to 1.0 μm below the surfaces of the first and second raised side rails 204, 205. The leading edge steps are typically defined using a photomask and formed by etching. This can be accomplished either before or after regions C1, C2 and C3 are formed. This allows leading edge steps to be formed having manufacturing tolerances less than manufacturing tolerances for tapers. In one embodiment, the manufacturing tolerances for leading edge steps are 10 μm or less. In contrast, prior art tapers generally have tolerances of 51 μm or greater. Improved tolerances reduce fly height variation between sliders.

Even when using leading edge tapers, NPAB sliders having a positive pressure region C1 in accordance with the invention are less sensitive to taper length variation than prior art NPAB sliders having cross rails (106 in FIG. 2).

Positive pressure region C1 reduces taper width. For any given taper length variation, there is less taper area variation in sliders having reduced taper width. As discussed previously, the taper area produces lift which affects the slider fly height. By reducing variation in taper area, variation in lift is also reduced which correspondingly reduces variation in fly height. This is illustrated in table 2 where the effect of taper length variation on fly height is shown for the prior art NPAB slider shown in FIG. 2 and embodiment 1 shown in FIGS. 3*a* and 3*b*.

TABLE 2

|  | Prior Art Δ Fly Height | | Embodiment 1 Δ Fly Height | |
| --- | --- | --- | --- | --- |
| Δ taper length | ID | OD | ID | OD |
| 51 μm | 4.6 nm | 5.1 nm | 0.0 nm | 1.5 nm |

As shown in table 2, for a taper length variation of 51 μm, the fly height variation for embodiment 1 at the inner diameter (ID) and the outer diameter (OD) is 0.0 and 1.5 nm, respectively. This is far superior to the fly height variation for the prior art NPAB slider of 4.6 and 5.1 nm at ID and OD, respectively, for the same taper length variation of 51 μm.

Although the invention has been described with reference to specific embodiments, those skilled in the art will recognize that changes may be made in form and detail without departing from the spirit and scope of the invention. For example, the read-write head can be a thin film or magneto-resistive head. The slider can be made from $Al_2O_3$-TiC or some other ceramic or non-ceramic material. Accordingly, such modifications come within this invention.

I claim:

1. A negative pressure air bearing slider having a leading end, a trailing end, and first and second sides comprising:

a first raised side rail positioned along said first side of said slider, said first raised side rail having an outer side;

a second raised side rail positioned along said second side of said slider, said second raised side rail having an outer side; and a recess extending along the longitudinal axis of said slider between said first and second raised side rails, said recess including a positive pressure region located toward said leading end, a negative pressure region located toward said trailing end, and a transition region located between said positive and negative pressure regions, wherein the width of said transition region is greater than or equal to about 5% of the distance between said outer sides of said first and second raised side rails and less than the width of said positive pressure region and less than the width of said negative pressure region.

2. The negative pressure air bearing slider of claim 1 wherein said positive pressure region is located adjacent said leading end.

3. The negative pressure air bearing slider of claim 1 wherein said positive pressure region is located adjacent said leading end and said transition region consists of one and only one channel extending between said positive and negative pressure regions.

4. The negative pressure air bearing slider of claim 3 wherein said transition region is located equidistant between said first and second sides of said slider.

5. The negative pressure air bearing slider of claim 3 wherein said positive pressure region is a single contiguous region and said negative pressure region is a single contiguous region.

6. The negative pressure air bearing slider of claim 3 wherein said transition region extends in a generally linear direction parallel to said first and second sides.

7. The negative pressure air bearing slider of claim 6 wherein said transition region is rectangular.

8. The negative pressure air bearing slider of claim 1 further comprising a third raised rail located within said negative pressure region.

9. The negative pressure air bearing slider of claim 8 further comprising a magnetic transducer located on a surface of said third raised rail.

10. The negative pressure air bearing slider of claim 1 wherein said positive pressure region, said transition region and said negative pressure region are formed during a single etch process step to the same etch depth.

11. The negative pressure air bearing slider of claim 10 wherein said etch depth is within a range of about 3 to 7 microns below surfaces of said first and second raised side rails.

12. The negative pressure air bearing slider of claim 10 wherein said first and second raised side rails include step regions adjacent to said leading end of said slider.

13. The negative pressure air bearing slider of claim 12 wherein said step regions are defined using a photomask and formed by etching.

14. The negative pressure air bearing slider of claim 12 wherein said positive pressure region, said transition region and said negative pressure region are formed during one etch process step to a first etch depth and wherein said step regions are formed during another etch process step to a second etch depth.

15. The negative pressure air bearing slider of claim 14 wherein said second etch depth is within a range of about 0.2 to 1.0 microns below surfaces of said first and second raised side rails.

16. The negative pressure air bearing slider of claim 1 wherein said first and second raised side rails include taper regions adjacent to said leading end of said slider.

17. The negative pressure air bearing slider of claim 1 wherein said first and second raised side rails extend from said leading end and end before reaching said trailing end.

18. The negative pressure air bearing slider of claim 1 wherein said width of said transition region is less than approximately 25% of said distance between said outer sides of said first and second raised side rails.

19. The negative pressure air bearing slider of claim 1 wherein said width of said transition region is less than or equal to 25% of said distance between said outer sides of said first and second raised side rails and greater than 5% of said distance between said outer sides of said first and second raised side rails.

20. The negative pressure air bearing slider of claim 1 wherein said transition region serves as a channel for communicating air from said positive pressure region to said negative pressure region.

21. The negative pressure air bearing slider of claim 1 wherein the length of said transition region is equal to about 8% of the distance between said leading end and said trailing end.

22. The negative pressure air bearing slider of claim 1 wherein said first raised side rail is located within 50 $\mu$m of said first side and said second raised side rail is located within 50 $\mu$m of said second side.

23. A negative pressure air bearing slider having a leading end, a trailing end, and first and second sides comprising:

a first raised side rail positioned along said first side of said slider, said first raised side rail having an outer side;

a second raised side rail positioned along said second side of said slider, said second raised side rail having an outer side; and a recess extending along the longitudinal axis of said slider between said first and second raised side rails, said recess including a positive pressure region located toward said leading end, a negative pressure region located toward said trailing end, and a transition region located between said positive and negative pressure regions, wherein the width of said positive pressure region is approximately fifty-five percent of the distance between said outer sides of said first and second raised side rails, the width of said transition region is approximately ten percent of said distance between said outer sides of said first and second raised side rails, and the width of said negative pressure region is approximately eighty-nine percent of said distance between said outer sides of said first and second raised side rails.

24. A negative pressure air bearing slider having a leading end, a trailing end, and first and second sides comprising:

a first raised side rail positioned along said first side of said slider, said first raised side rail having an outer side;

a second raised side rail positioned along said second side of said slider, said second raised side rail having an outer side; and a recess extending along the longitudinal axis of said slider between said first and second raised side rails, said recess including a positive pressure region located toward said leading end, a negative pressure region located toward said trailing end, and a transition region located between said positive and negative pressure regions, the width of said transition region being greater than or equal to about 3% of the distance between said outer sides of said first and second raised side rails and less than the width of said positive pressure region and less than the width of said negative pressure region, wherein at the widest point of said positive pressure region, said positive pressure region is between 5% to 70% of said distance between said outer sides of said first and second raised side rails.

25. A method of forming a negative pressure air bearing slider having a leading end, a trailing end, and first and second sides comprising the steps of:

forming a mask over a first region of a bar and leaving a second region of said bar exposed; and etching said second region of said bar, thereby forming a first raised side rail positioned along said first side of said slider, a second raised side rail positioned along said second side of said slider, said first and second raised side rails having outer sides, and a recess extending along the longitudinal axis of said slider between said first and second raised side rails, said recess having a substantially uniform depth and including a positive pressure region located toward said leading end, a negative pressure region located toward said trailing end, and a transition region located between said positive and negative pressure regions, the width of said transition region being greater than or equal to about 5% of the distance between said outer sides of said first and second raised side rails.

26. The method of claim 25 wherein said width of said transition region is between 5 and 25% of said distance between said outer sides of said first and second raised side rails.

27. A negative pressure air bearing slider having a leading end, a trailing end, and first and second sides comprising:

a first raised side rail positioned along said first side of said slider, said first raised side rail having an outer side and an inner side;

a second raised side rail positioned along said second side of said slider, said second raised side rail having an outer side and an inner side; and a substantially planar recessed surface area extending between said inner sides of said first and second raised side rails, said recessed surface area and said inner sides of said first and second raised side rails forming a recess which extends along the longitudinal axis of said slider, said recess including a positive pressure region located toward said leading end, a negative pressure region located toward said trailing end, and a transition region located between said positive and negative pressure regions, the distance between said inner sides of said first and second raised side rails at said transition region being greater than or equal to about 5% of the distance between said outer sides of said first and second raised side rails.

28. The negative pressure air bearing slider of claim 27 wherein said inner sides of said first and second raised side rails comprise a plurality of planar surfaces.

29. The negative pressure air bearing slider of claim 27 wherein said distance between said inner sides of said first and second raised side rails at said transition region is less than or equal to 25% of said distance between said outer sides of said first and second raised side rails.

30. The negative pressure air bearing slider of claim 27 wherein the distance between said inner sides of said first and second raised side rails at said positive pressure region is greater than said distance between said inner sides of said first and second raised side rails at said transition region.

31. The negative pressure airbearing slider of claim 27 wherein said substantially planar recessed surface area is within a range of about 3 to 7 microns below surfaces of said first and second raised side rails.

32. A negative pressure air bearing slider having a leading end, a trailing end and first and second sides comprising:

a first raised side rail positioned along said first side of said slider, said first raised side rail having an outer side;

a second raised side rail positioned along said second side of said slider, said second raised side rail having an outer side; and a recess extending between said first and second raised side rails, said recess including a positive pressure region located toward said leading end, a negative pressure region located toward said trailing end, and a substantially rectangular transition region located between said positive and negative pressure regions, said transition region consisting of one and only one channel for communicating air from said positive pressure region to said negative pressure region, said transition region being located substantially equidistant between said first and second sides of said slider, the width of said transition region being less than the width of said positive pressure region and less than the width of said negative pressure region and greater than or equal to 3% of the distance between said outer sides of said first and second raised side rails.

* * * * *